United States Patent
Itoguchi et al.

(10) Patent No.: US 10,683,373 B2
(45) Date of Patent: Jun. 16, 2020

(54) METHOD FOR PRODUCING POLYOLEFIN AND POLYOLEFIN PRODUCTION SYSTEM

(71) Applicant: Sumitomo Chemical Company, Limited, Tokyo (JP)

(72) Inventors: Satoshi Itoguchi, Ichihara (JP); Naganjaneyulu Suruvu, Ichihara (JP); Shunpei Funaoka, Ichihara (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 106 days.

(21) Appl. No.: 16/114,489

(22) Filed: Aug. 28, 2018

(65) Prior Publication Data
US 2019/0062466 A1 Feb. 28, 2019

(30) Foreign Application Priority Data
Aug. 29, 2017 (JP) .................. 2017-164710

(51) Int. Cl.
*C08F 2/34* (2006.01)
*C08F 2/01* (2006.01)
(Continued)

(52) U.S. Cl.
CPC .............. *C08F 2/34* (2013.01); *B01J 4/008* (2013.01); *B01J 8/245* (2013.01); *B01J 19/0006* (2013.01);
(Continued)

(58) Field of Classification Search
CPC ..... C08F 2/34; C08F 2/01; C08F 10/00; B01J 4/0008; B01J 8/245; B01J 19/0006;
(Continued)

(56) References Cited

U.S. PATENT DOCUMENTS

| | | | |
|---|---|---|---|
| 5,235,009 A | 8/1993 | Hogan | |
| 5,728,353 A * | 3/1998 | Govoni | ............... B01J 8/26 422/145 |

(Continued)

FOREIGN PATENT DOCUMENTS

| | | |
|---|---|---|
| EP | 0574821 A2 | 12/1993 |
| EP | 2803680 A1 | 11/2014 |

(Continued)

OTHER PUBLICATIONS

Extended European Search Report dated Dec. 21, 2018 in EP Application No. 18189318.1.

*Primary Examiner* — William K Cheung
(74) *Attorney, Agent, or Firm* — Panitch Schwarze Belisario & Nadel LLP

(57) ABSTRACT

A polyolefin production system is provided. The polyolefin production system includes a plurality of gas-phase polymerization tanks configured to polymerize an olefin gas to form a polyolefin, a gas transfer series line connecting the plurality of the gas-phase polymerization tanks to each other in series, a compressor having an inlet and an outlet and being configured to compress an olefin-containing gas, a gas main feed line disposed at the frontmost gas-phase polymerization tank and configured to guide the gas fed from the outlet of the compressor to the frontmost gas-phase polymerization tank, a gas discharge line disposed at the rearmost gas-phase polymerization tank, and a first valve installed in the gas main feed line.

21 Claims, 19 Drawing Sheets

(51) Int. Cl.
  *C08F 10/00*   (2006.01)
  *B01J 19/00*   (2006.01)
  *B01J 8/24*    (2006.01)
  *B01J 4/00*    (2006.01)

(52) U.S. Cl.
  CPC ....... *B01J 19/0033* (2013.01); *B01J 19/0053* (2013.01); *C08F 2/01* (2013.01); *C08F 10/00* (2013.01); *B01J 2219/0004* (2013.01); *B01J 2219/00162* (2013.01); *B01J 2219/00164* (2013.01); *B01J 2219/00774* (2013.01)

(58) Field of Classification Search
  CPC ............... B01J 19/0033; B01J 19/0053; B01J 2219/0004; B01J 2219/00162; B01J 2219/00164; B01J 2219/00774
  USPC ......................................................... 526/65
  See application file for complete search history.

(56) References Cited

U.S. PATENT DOCUMENTS

| | | |
|---|---|---|
| 2009/0171019 A1 | 7/2009 | Kumamoto et al. |
| 2010/0317811 A1 | 12/2010 | Mazzucco et al. |

FOREIGN PATENT DOCUMENTS

| | | |
|---|---|---|
| JP | 2003277412 A | 10/2003 |
| JP | 2009173897 A | 8/2009 |
| JP | 2011508800 | 3/2011 |
| WO | 2006022736 A1 | 3/2006 |

\* cited by examiner

METHOD FOR PRODUCING POLYOLEFIN AND POLYOLEFIN PRODUCTION SYSTEM

CROSS-REFERENCE TO RELATED APPLICATION

This application claims priority under 35 U.S.C. § 119(b) to Japanese Patent Application No. 2017-164710, filed on Aug. 29, 2017, the disclosure of which is incorporated herein by reference in its entirety.

TECHNICAL FIELD

The present invention relates to a method for producing polyolefin and a polyolefin production system.

BACKGROUND

A method for producing a polyolefin by polymerizing olefins in a system having a plurality of gas-phase polymerization tanks in which olefins are polymerized is conventionally known.

The method is disclosed in Japanese Unexamined Patent Publication No. 2011-508800, Japanese Unexamined Patent Publication No. 2003-277412, U.S. Pat. No. 5,235,009, and Japanese Unexamined Patent Publication No. 2009-173897, etc.

SUMMARY

In the conventional method, however, a number of compressors may be required, or control of the gas flow rate and pressure in each of the gas-phase polymerization tanks may be not easy in some cases.

An object of the present invention made in the light of these circumstances is to provide a method for producing a polyolefin and a polyolefin production system, capable of easily controlling the gas flow rate and pressure in each of the gas-phase polymerization tanks even with a small number of compressors.

The polyolefin production system of the present invention comprises:

a plurality of gas-phase polymerization tanks configured to polymerize an olefin gas to form a polyolefin;

a gas transfer series line connecting the plurality of the gas-phase polymerization tanks to each other in series;

a compressor comprising an inlet and an outlet and being configured to compress an olefin-containing gas;

a gas main feed line disposed at the frontmost gas-phase polymerization tank, configured to guide the gas fed from the outlet of compressor to the frontmost gas-phase polymerization tank;

a gas discharge line disposed at the rearmost gas-phase polymerization tank; and a first valve installed in the gas main feed line.

According to the present invention, the flow rate of the gas fed to each of the gas-phase polymerization tanks can be easily controlled at any constant flow rate value, and the pressure in each of the gas-phase polymerization tanks can be easily controlled to be at any constant pressure value.

Here, the first valve may be a butterfly valve or an eccentric rotary plug valve.

The system can further comprise a second valve installed in the gas transfer series line connecting at least one pair of the gas-phase polymerization tanks, and/or in the gas discharge line.

In this case, since a constant difference in pressure can be provided between in front and rear of the second valve, a pressure range suitable for each of the gas-phase polymerization tanks can be given. It is preferable that the second valves are provided between all of the gas-phase polymerization tanks in the gas transfer series line. Also, the second valve may be a butterfly valve or an eccentric rotary plug valve.

The system may further comprise a gas sub-feed line connecting at least one of the gas-phase polymerization tanks other than the frontmost gas-phase polymerization tank to the outlet of the compressor without going through each of other gas-phase polymerization tanks.

Thereby, the flow rate of monomers fed to the gas-phase polymerization tanks other than the frontmost pas-phase polymerization tank can be set independently from the frontmost gas-phase polymerization tank, so that flexibility in setting polymerization conditions for each of the gas-phase polymerization tanks increases. It is preferable that gas is fed to all of the gas-phase polymerization tanks other than the frontmost gas-phase polymerization tank through the gas sub-feed line(s).

The system may have a third valve installed in the gas sub-feed line.

Thereby, the flow rate of the entire gas fed to the gas-phase polymerization tanks other than the frontmost gas-phase polymerization tank can be also easily controlled in a desired range.

Also, the system may further comprise a gas purge line for connecting the gas transfer series line to the inlet of the compressor without going through each of other gas-phase polymerization tanks.

Thereby, the flow rate of the gas fed to the gas-phase polymerization tanks other than the frontmost gas-phase polymerization tank can be further finely adjusted.

Also, the system may have a fourth valve installed in the gas purge line.

Also, the system can further comprise a particle transfer series line connecting the plurality of the gas-phase polymerization tanks to each other in series.

Also, the system can comprise a cone member having a tapered slope with inner diameter thereof becoming smaller downward and an opening at the bottom end of the tapered slope, or a gas distributor.

Also, it is preferable that the inner diameters of the gas transfer series lines in the system are smaller than the inner diameters of the gas-phase polymerization tanks respectively.

The method for producing a polyolefin of the present invention is a method for producing a polyolefin with use of the polyolefin production system described above, and comprises: a step of feeding an olefin-containing gas compressed by the compressor to the frontmost gas-phase polymerization tank through the gas main feed line;

a step of transferring the gas discharged from the frontmost gas-phase polymerization tank to the rearmost gas-phase polymerization tank through the gas transfer series line, sequentially;

a step of returning the gas discharged from the rearmost gas-phase polymerization tank to the compressor through the gas discharge line; and a step of controlling the flow rate of the gas to be fed to the frontmost gas-phase polymerization tank through the gas main feed line by the first valve installed in the gas main teed line.

Hereupon, the method may comprise a step of controlling the aperture of the second valve in such a manner that the pressure in the upstream gas-phase polymerization tank than the second valve, the difference between the pressure in the upstream gas-phase polymerization tank than the second valve and the pressure in the further upstream gas-phase polymerization tank than the upstream gas-phase polymerization tank, the difference between the pressure in the upstream gas-phase polymerization tank than the second valve and the pressure in the downstream gas-phase polymerization tank than the second valve, or the difference between the pressure in one of the gas-phase polymerization tanks and the pressure in the downstream part than the second valve in the gas discharge line is in a predetermined range.

Also, the method may comprise a step of feeding the gas compressed by the compressor to at least one of the gas-phase polymerization tanks other than the frontmost pas-phase polymerization tank through the gas sub-feed line.

Also, the method may comprise a step of controlling the flow rate of the gas to be fed through the gas sub-feed line by the third valve.

Also, the method may further comprise a step of returning a part of the gas flowing in the gas transfer series line to the compressor through the gas purge line.

Also, the method allows the flow rate of the gas returned to the compressor to be adjusted through the gas purge line by the fourth valve.

Also, the method may comprise a step of transferring polyolefin particles sequentially from the frontmost gas-phase polymerization tank to the rearmost gas-phase polymerization tank through the particle transfer series line.

Also, in each of the gas-phase polymerization tanks, a fluidized bed of polyolefin particles or a spouted bed of polyolefin particles can be formed.

According to the present invention, a method and a system capable of easily controlling the gas flow rate and the pressure in each of the gas-phase polymerization tanks even with a small number of compressors, are provided.

DETAILED DESCRIPTION

With reference to drawings, a method for producing a polyolefin in embodiments of the present invention is described.

First Embodiment

Figure 1:
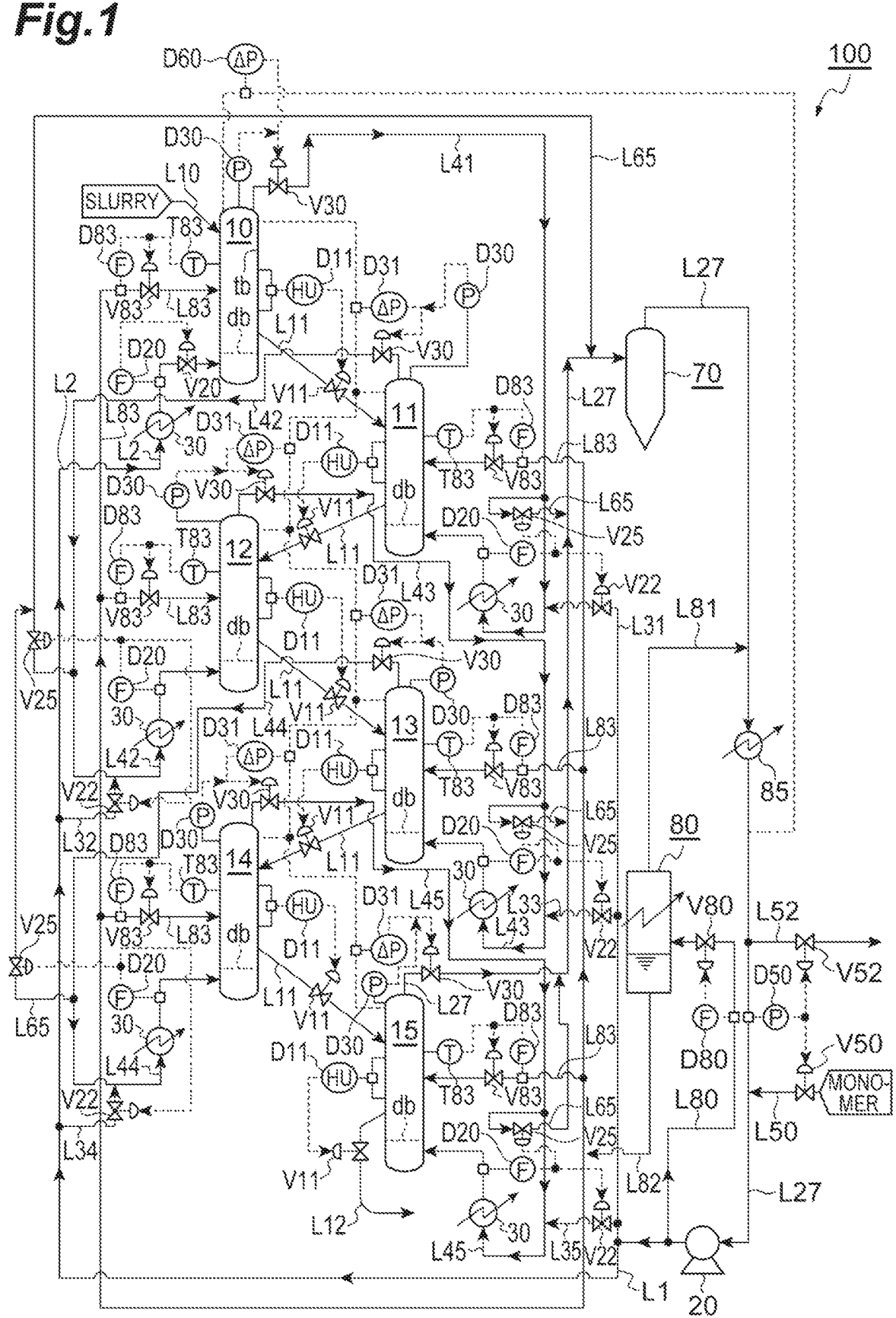
FIG. 1 is a flow chart illustrating a production system for use in the production method of a polyolefin in a first embodiment of the present invention.

FIG. 1 is a flow chart illustrating a production system 100 for use in the production method of a polyolefin in a first embodiment of the present invention.

The production system 100 mainly comprises gas-phase polymerization tanks 10 to 15, a compressor 20, a cyclone 70, and a condenser 80.

In each of the gas-phase polymerization tanks 10 to 15, an olefin gas fed thereto is polymerized to form a polyolefin. In the present embodiment, each of the gas-phase polymerization tanks 10 to 15 has a cylindrical container tb extending in the vertical direction and a distributor db installed in the cylindrical container tb, allowing a gas fed under the distributor db to form a fluidized bed of polyolefin particles on the distributor db.

The gas-phase polymerization tanks 10 to 15 are connected in series in this order with a particle transfer series line L11, so that polyolefin particles can be transferred to the downstream side. The particle transfer series line L11 is a line separate from gas transfer series lines L41 to L45. To the rearmost gas-phase polymerization tank 15, the particle discharge line L12 is connected. Each of the particle transfer series line L11 and the particle discharge line L12 is provided with a valve V11 for adjusting the flow rate of particles. To the frontmost gas-phase polymerization tank 10, a line L10 for feeding a catalyst component is connected.

Each of the gas-phase polymerization tanks 10 to 15 is provided with a detector D11 for measuring the hold-up (mass) of particles in the tank. Specifically, the detector D11 can measure the hold-up of particles based on, for example, a differential pressure between the top and bottom of a fluidized bed.

The aperture of each valve V11 for adjusting the flow rate of particles is adjusted such that the particle hold-up in a gas-phase polymerization tank on the upstream side measured by the detector D11 is in a certain predetermined range.

The frontmost gas-phase polymerization tank 10 is provided with a gas main feed line L2 for feeding an olefin-containing gas fed from the outlet of the compressor 20 through a line L1, under the distributor db of the gas-phase polymerization tank 10. The gas main feed line L2 is provided with a heat exchanger 30 for cooling gas. The gas main feed line L2 is further provided with a detector D20 for detecting the flow rate and a valve (first valve) V20 for adjusting the flow rate. The aperture of the valve V20 for adjusting the flow rate is adjusted such that the flow rate of the gas measured by the detector D20 is in a certain predetermined range.

Although the type of the valve (first valve) V20 for adjusting the flow rate is not limited, a butterfly valve and an eccentric rotary plug valve are preferred from the viewpoints of excellent controllability of the flow rate adjustment and capability of preventing powder from clogging in the valve.

The gas-phase polymerization tanks 10 to 15 are connected in series in this order with gas transfer series lines L41 to L45, so that the gas discharged from the top of the gas-phase polymerization tanks can be fed under the distributor db in the gas-phase polymerization tanks downstream thereof, respectively. Each of the gas transfer series lines L41 to L45 is provided with a heat exchanger 30 for cooling the gas. The inner diameters of the gas transfer series lines L41 to L45 are smaller than the inner diameters of the gas-phase polymerization tanks 10 to 15 respectively.

In order to compensate the olefins consumed in the gas-phase polymerization tanks, gas sub-feed lines L31 to L35 for feeding gas fed from the outlet of the compressor 20 are connected to the gas-phase polymerization tanks 11 to 15, respectively, other than the frontmost gas-phase polymerization tank 10. In the present embodiment, the gas sub-feed lines L31 to L35 feed the gas upstream of the heat exchanger 30 and downstream of the valve V30 in the gas transfer series lines L41 to L45 respectively.

The gas transfer series lines L41 to L45 are provided with a detector D20 for detecting flow rate downstream of a merging position of the gas sub-feed lines L31 to L35. Also, each of the gas sub-feed lines L31 to L35 is provided with a valve (third valve) V22 for adjusting flow rate. Furthermore, to the gas transfer series lines L41 to L45, gas purge lines L65 having a valve (fourth valve) V25 are connected upstream of the detector 20. Each of the gas purge lines L65 purges gas upstream of the cyclone 70 in a gas discharge line L27 described below.

Although the type of the valve (third valve) V22 and the valve (fourth valve) V25 for adjusting the flow rate is not limited, a butterfly valve and an eccentric rotary plug valve are preferred from the viewpoints of controllability excellent in flow rate adjustment and capability of preventing powder from clogging in the valve.

The aperture of the valve V22 for adjusting the flow rate in the gas sub-feed lines L31 to L35 and the aperture of the valve V25 in the gas purge lines L65 are adjusted such that the total flow rate of the gas fed to the gas-phase polymerization tanks 11 to 15 respectively is in a certain predetermined range based on the flow rate obtained by the detector D20.

The rearmost gas-phase polymerization tank 15 is provided with a gas discharge line L27 for discharging gas from the top of the gas-phase polymerization tank 15, and the gas discharging line L27 is connected to the inlet of the compressor 20 through the cyclone 70.

To each of the gas transfer series lines L41 to L45 and the gas discharge line L27, the valve (second valve) V30 for adjusting pressure is connected. The gas discharge line L27 is provided with the valve V30 upstream of merging positions of the gas purge lines L65.

In order to prevent the valve V30 from being under bad effects by particles such as clogging of particles, a cyclone may be installed upstream of the valve V30 in the lines L41 to L45.

Although the type of the valve (second valve) V30 for adjusting the pressure is not limited, a butterfly valve and an eccentric rotary plug valve are preferred from the viewpoints of controllability excellent in pressure adjustment and capability of preventing powder from clogging in the valve.

The gas-phase polymerization tank 10 is provided with a pressure gauge D60 measuring a pressure difference between the pressure in the gas-phase polymerization tank 10 and the pressure in the downstream part (the compressor inlet side) than the valve 30 in the gas discharge line L27. The aperture of the valve V30 in the gas transfer series line L41 is adjusted such that the pressure difference is in a certain predetermined range based on the pressure gauge D60. When the aperture of the valve V30 in the gas transfer series line L41 is adjusted based on the pressure gauge D60, the pressure in the gas-phase polymerization tank 10 is adjusted in response to the pressure change of the gas discharge line L27 and this is preferable.

The gas-phase polymerization tank 10 is provided with a pressure gauge D30, and the aperture of the valve V30 installed in the gas transfer series line L41 may be adjusted such that the pressure in the gas-phase polymerization tank 10 is in a certain predetermined range based on the pressure at the pressure gauge D30.

The gas-phase polymerization tanks 11 to 15 are provided with a pressure gauge D31 measuring the difference in pressure between each of the gas-phase polymerization tanks 11 to 15 and the gas-phase polymerization tank preceding the each of the gas-phase polymerization tanks. The aperture of each valve V30 in the gas transfer series lines L41 to L45 and the gas discharge line L27 is adjusted such that the differential pressure is in a certain predetermined range based on the differential pressure at a pressure gauge D31.

Although the second valve V30 in the gas transfer series line L42 is controlled by the pressure gauge D31 that measures the difference between the pressure in the gas-phase polymerization tank 11 upstream of the second valve V30 and the pressure in the gas-phase polymerization tank 10 further upstream of the upstream gas-phase polymerization tank 11, the second valve V30 can be controlled by the pressure gauge D31 that measures the difference between the pressure in the gas-phase polymerization tank 11 upstream of the second valve V30 and the pressure in the gas-phase polymerization tank 12 downstream of the second valve. The control of the valves V30 installed in the gas transfer series line L41, L43 to L45 and the gas discharge line L27 can be changed like the above.

The pressure in each of the gas-phase polymerization tanks 11 to 15 is thereby controlled in a certain range. For example, in the case where the differential pressure is set at a constant value other than zero, the pressures in the gas-phase polymerization tanks 10 to 15 can be different from each other.

Each of the polymerization tanks 11 to 15 is provided with a pressure gauge D30, the aperture of each of the valves V30 in the gas transfer series line L42 to L45 and the gas discharge line L27 may be adjusted such that the pressure in the each of the gas-phase polymerization tank 11 to 15 is in a certain predetermined range based on the pressure gauge D30.

Each of the gas-phase polymerization tanks 11 to 15 may be provided with a pressure gauge (not shown) measuring a pressure difference between the pressure in the each gas-phase polymerization tanks 11 to 15 and the pressure in the downstream part (the compressor inlet side) than the valve 30 in the gas discharge line L27. The aperture of the each valve V30 in the gas transfer series line L42 to L45 and the gas discharge line L27 may be adjusted such that the pressure difference is in a certain predetermined range based on the pressure gauge.

The gas discharge line L27 is provided with a cyclone 70 for collecting particles in the gas, and a heat exchanger 85 for heating or cooling the gas. In order to prevent the valve V30 from being adversely affected by the particles such as particle clogging, a cyclone may be provided in an upstream part than the valve V30 in the gas transfer series line L41 to L45 and the gas discharge line L27. It is preferable that intentional opening the valve V30 at an arbitrary aperture for a predetermined duration at a predetermined time intervals to prevent the valve V30 from particle clogging.

The gas discharge line L27 is further provided with a pressure gauge D50 for detecting the pressure in the gas discharge line L27, preferably at downstream of the cyclone 70. Also, to the gas discharge line L27, a monomer feed line L50 having a valve V50 for adjusting pressure and a gas discharge line L52 having a valve V52 for adjusting pressure are connected, preferably at downstream of the cyclone 70.

In order to control the pressure in the gas discharge line L27, i.e., the pressure in an circulation system of olefin monomers on the low-pressure side, in a certain predetermined range, the valves V50 and V52 adjust the amount of monomer gas flowing in the gas discharge line L27 through the line L50 and the amount of gas discharged from the gas discharge line L27 through the line L52, based on the pressure at the pressure gauge D50.

The condenser 80 and the compressor 20 are connected through a line L80. The line L80 is provided with a valve V80 for adjusting the flow rate and a flow rate detector D80. The aperture of the valve V80 is adjusted such that the amount of the gas fed to the condenser 80 from the compressor 20 is in a certain predetermined range, based on the flow rate detected by the flow rate detector D80.

In the condenser 80, the gas is cooled to form liquefied olefins. Unliquidated gas is returned to the gas discharge line L27 through a line L81.

To each of the gas-polymerization tanks 10 to 15, an individual liquefied olefin introduction line L83 for individually feeding liquefied olefins fed from the condenser 80 to each of the gas-phase polymerization tanks 10 to 15 through a gathering line L82 is connected.

Each of the individual liquefied olefin introduction lines L83 is provided with a flow rate detector D83 and a valve V83 for adjusting flow rate. Also, each of the gas-phase polymerization tanks 10 to 15 is provided with a temperature detector T83 for measuring the temperature of a fluidized bed. The aperture of the valve V83 is adjusted based on the temperature detected by the temperature detector T83, such that the flow rate of the liquefied olefins fed to each of the gas-phase polymerization tanks 10 to 15 is equal to a predetermined value corresponding to the temperature of the fluidized bed.

(Method for Producing a Polyolefin)

A method for producing polyolefin particles with use of such a system is described below.

An olefin-containing gas compressed by a compressor 20 is fed to a gas-phase polymerization tank 10 through a gas main feed line L2. The gas containing unreacted olefins discharged from the gas-phase polymerization tank 10 is transferred to the gas-phase polymerization tanks 11 to 15 through the gas transfer series lines L41 to L44 respectively, so that polyolefin-containing particles are obtained through polymerization of olefins in the gas-phase polymerization tanks 10 to 15.

Also, the gas compressed by the compressor is fed to the gas-phase polymerization tanks 11 to 15 other than the frontmost gas-phase polymerization tank 10 through a plurality of the gas sub-feed lines L31 to L35 respectively. Also, on an as needed basis, the gas is returned to a compressor 20 from the gas transfer series lines L41 to L45 through the gas purge lines L65.

The gas discharged from the rearmost gas-phase polymerization tank 15 is returned to the compressor 20 through the gas discharge line L27 so as to be circulated.

The polyolefin particles containing the polyolefin formed by the polymerization are transferred to the rearmost gas-phase polymerization tank 15 from the frontmost gas-phase polymerization tank 10 through the particle transfer series line L11.

The flow rate of the gas fed to the frontmost gas-phase polymerization tank 10 through the gas main feed line L2 is controlled to be in a certain predetermined range by the valve V20 installed in the gas main feed line L2.

Also, the flow rate of the gas fed to the gas-phase polymerization tanks 11 to 15 other than the frontmost gas-phase polymerization tank 10 through the gas sub-feed lines L31 to L35 respectively, and the amount of the gas discharged from the gas transfer series lines L41 to L45 through the gas purge lines L65 respectively are controlled by the valve V20 installed in the gas sub-feed lines L31 to L35 respectively and the valve V25 installed in the gas purge lines L65 respectively, such that the net flow rate of the entire gas fed to the gas-phase polymerization tanks 11 to 15, respectively, other than the frontmost gas-phase polymerization tank 10 is maintained to be constant.

On an as needed basis, the flow rate of the gas discharged from the gas-phase polymerization tanks 10 to 15 through the gas transfer series lines L41 to L45 and the gas discharge line L27 respectively is controlled by the valve V30 installed in the gas transfer series lines L41 to L45 or the gas discharge line L27 respectively, such that the pressure in the gas-phase polymerization tanks 10 to 15 respectively is maintained to be constant.

The pressure in the gas-phase polymerization tanks 10 to 15 may be in a range allowing olefins to be present in a gas phase in the gas-phase polymerization tanks 10 to 15, typically normal pressure to 10 MPaG, preferably 0.2 to 8 MPaG, more preferably 0.5 to 5 MPaG.

The temperature in the gas-phase polymerization tanks 10 to 15 may be typically 0 to 120° C., preferably 20 to 100° C., more preferably 40 to 100° C.

Since the polymerization reaction is an exothermic reaction, the temperature of the gas discharged from a gas-phase polymerization tank increases. Through appropriate cooling of a circulated gas by heat exchangers 85 and 30, the temperature in the gas-phase polymerization tanks 10 to 15 can be controlled in a certain range.

Also, when the temperature in a gas-phase polymerization tank increases beyond a specified range, liquid olefins may be fed into the gas-phase polymerization tank through the individual liquefied olefin introduction line L83, so that polyolefin particles and the like can be efficiently cooled by the latent heat of vaporization of the liquid olefins. Specifically, the aperture of a valve V83 in each of the individual liquefied olefin introduction line L83 is adjusted to feed a predetermined amount of liquid olefins into the gas-phase polymerization tank corresponding to the temperature in each of the gas-phase polymerization tanks.

The olefins consumed by a polymerization reaction in each of the gas-phase polymerization tanks 10 to 15 are compensated into the compressor 20 through a monomer feed line L50.

As described above, polyolefin particles containing the polyolefin formed in each of the gas-phase polymerization tanks 10 to 15 are transferred to the rear gas-phase polymerization tanks through a particle transfer series line L11 respectively.

Hereupon, with a pressure $P_2$ in the rear gas-phase polymerization tank being lower than a pressure $P_1$ in the front gas-phase polymerization tank, particles can be easily transferred. In addition thereto, with the connection place between the rear gas-phase polymerization tank and the particle transfer series line L11 being lower than the connection place between the front gas-phase polymerization tank and the particle transfer series line L11, the particle transfer series line L11 can have a downward gradient part from the front tank to the rear tank, so that the transfer of particles can be more easily performed. It is preferable that the particle transfer series line L11 has no upward gradient part and no horizontal part. With the angle made between the direction of the particle transfer series line extending diagonally downward and a horizontal plane being represented by an inclination angle $\theta$ of the transfer line, the inclination angle $\theta$ is preferably 30° or more, more preferably 35° or more, furthermore preferably 40° or more, particularly preferably 55' or more. The upper limit is 90°.

Specifically, it is preferable that 130 kPa$\geq P_1 - P_2 \geq 0$ is satisfied.

Hereupon, amount of polyolefin particles transferred to the rear gas-phase polymerization tank through the particle transfer series line L11 is controlled by each valve V11 such that the particle hold-up (mass) in the front gas-phase polymerization tank is made constant.

The average residence time of polyolefin particles in each of the gas-phase polymerization tanks can be 0.01 to 10 hours, preferably 0.1 to 1 hour.

In each of the gas-phase polymerization tanks 10 to 15, it is preferable that the polymerization is performed in the presence of a polymerization catalyst. As a method for feeding a polymerization catalyst to the gas-phase polymerization tank 10, catalyst-containing polyolefin particles produced by polymerization of polyolefin particles in advance in the presence of a catalyst in a prior polymerization tank not shown in drawing may be fed. Alternatively, as the polymerization catalyst fed into the gas-phase polymerization tank 10, a preliminary polymerized catalyst or a solid catalyst may be directly fed.

Examples of the method of prior polymerization include, though not particularly limited, a method for polymerizing olefins in liquefied olefins, which is referred to as bulk polymerization and in that case, a slurry containing liquefied olefin and polyolefin particles is fed to the gas-phase polymerization tank 10 through the line L10.

In the gas-phase polymerization tanks 11 to 15, due to the catalyst in the polyolefin particles fed from the frontmost gas-phase polymerization tank 10, the olefins can be efficiently polymerized.

The particles discharged from the rearmost gas-phase polymerization tank 15 through the line L12 are appropriately subjected to treatments such as drying and deactivation to obtain polyolefin particles using known methods. The polyolefin particles produced before deactivation may be subjected to a further polymerization step.

(Effect)

According to the present embodiment, a gas compressed by a compressor 20 is fed to the frontmost gas-phase polymerization tank 10 through the gas main feed line L2, the gas discharged from the frontmost gas-phase polymerization tank 10 is transferred to the rearmost gas-phase polymerization tank 15 through gas transfer series lines L41 to L45, and a gas discharged from the rearmost gas-phase polymerization tank 15 can be returned to the compressor 20 through a gas discharge line L27, so that the number of compressors can be reduced. Also, an olefin-containing gas can flow into each of the gas-phase polymerization tanks 10 to 15 in series, so that the flow rate and the pressure of the gas in each of the gas-phase polymerization tanks can be easily maintained to be constant. Furthermore, since the flow rate of the olefin-containing gas fed to the gas-phase polymerization tank 10 can be controlled by a valve (first valve) V20 installed in the gas main feed line L2, the flow rates of the gas fed to the gas-phase polymerization tank 10 and the gas fed to the rear gas-phase polymerization tanks 11 to 15 can be more easily controlled.

Furthermore, the pressure in the gas-phase polymerization tanks 10 to 15 can be controlled through adjustment of the aperture of the valve (second valve) V30 installed in the gas transfer series lines L41 to L45 and the gas discharge line L27 respectively. The pressure in each of the gas-phase polymerization tanks 10 to 15 can be therefore easily controlled to be constant in any range, and the difference in pressure represented by the numerical formula described above can be easily provided among the gas-phase polymerization tanks 10 to 15.

Also, a monomer gas can be fed to the gas-phase polymerization tanks 11 to 15 other than the frontmost gas-phase polymerization tank 10 through the gas sub-feed lines L31 to L35 respectively, so that the flow rate and the pressure of the gas in the gas-phase polymerization tanks 11 to 15 respectively can be easily controlled to be constant.

Furthermore, since the amount of the gas fed through the gas sub-feed line can be adjusted by the third valve V22, the flow rate of the entire gas fed to each of the gas-phase polymerization tanks 11 to 15 other than the frontmost gas-phase polymerization tank 10 can be easily controlled in a desired range.

Also, since a part of the gas flowing in the gas transfer series lines L41 to L45 can be returned to the compressor 20 through the gas purge lines L65, the amount of the gas fed to the gas-phase polymerization tanks 11 to 15 other than the frontmost gas-phase polymerization tank 10 can be further finely adjusted.

Furthermore, the amount of the gas returned to the compressor 20 through the gas purge lines L65 can be adjusted by the valve (fourth valve) V25, the adjustment of the amount of the gas can be more easily performed.

Furthermore, polyolefin particles can be transferred from the frontmost gas-phase polymerization tank 10 to the rearmost gas-phase polymerization tank 15 through the particle transfer series line L11, so that multi-stage polymerization of a polyolefin is achieved with effects of being capable of improving a reaction efficiency, further narrowing the residence time distribution of polyolefin particles in a polymerization tank, and the like.

The stable production of a polyolefin can be thereby achieved.

(Catalyst for Use in Producing Polyolefin)

Examples of the catalyst for use in producing a polyolefin in the present invention include a Ziegler-Natta catalyst and a Metallocene catalyst, preferably a Ziegler-Natta catalyst. Examples of the Ziegler-Natta catalyst include a Ti—Mg catalyst such as a solid catalyst component obtained by bringing a magnesium compound into contact with a titanium compound, and a catalyst containing a solid catalyst component obtained by bringing a magnesium compound into contact with a titanium compound, an organoaluminum compound, and, on an as needed basis, a third component such as an electron-donating compound; preferably a catalyst containing a solid catalyst component obtained by bringing a magnesium compound into contact with a titanium compound, an organoaluminum compound, and, on an as needed basis, a third component such as an electron-donating compound; more preferably a catalyst containing a solid catalyst component obtained by bringing a magnesium compound into contact with a halogenated titanium compound, an organoaluminum compound, and an electron-donating compound. As the catalyst, a catalyst preliminarily activated by contact with a small amount of olefins may be used.

An example of the detail of the catalysts and the production method is disclosed, for example, in Japanese Unexamined Patent Publication No. H7-216017 and Japanese Unexamined Patent Publication No. 2004-67850.

(Regarding Olefin and Polyolefin)

Examples of the olefins fed to each of the gas-phase polymerization tanks include at least one selected from the group consisting of α-olefins having 1 to 12 carbon atoms. For example, in the case where ethylene is fed to a gas-phase polymerization tank, polyethylene-containing particles can be obtained, and in the case where propylene is fed, polypropylene-containing particles can be obtained.

The olefins fed to each of the gas-phase polymerization tanks may include two or more types of olefins. For example, in the case where ethylene and at least one selected from the group consisting of α-olefins having 3 to 12 carbon atoms are fed, particles containing ethylene-α-olefin copolymers can be obtained. Specifically, in the cases of the α-olefins of propylene, 1-butene, 1-hexene and 4-methyl-1-pentene, particles containing an ethylene-propylene copolymer, an ethylene-1-butene copolymer, an ethylene-1-hexene copolymer and an ethylene-4-methyl-1-pentene copolymer, respectively, can be obtained. Alternatively, in the cases where propylene and at least one olefin selected from the group consisting of α-olefins having 4 to 12 carbon atoms are fed to a gas-phase polymerization tank, particles containing propylene-α-olefin copolymers can be obtained. Specifically, in the case of the α-olefin of 1-butene, particles containing a propylene-1-butene copolymer can be obtained.

It is preferable that the olefins include propylene. As a result, particles containing a polymer or a copolymer including propylene as a monomer unit can be obtained.

Furthermore, to each of the gas-phase polymerization tanks, an olefin monomer having a composition to provide a polymer or a copolymer that is the same as the polymer or the copolymer to constitute the polyolefin particles fed from the prior polymerization tank may be fed, or an olefin monomer having a composition to provide a polymer or a copolymer that is different from the polymer or the copolymer to constitute the polyolefin particles fed from the prior polymerization tank may be fed. Particles of so-called heterophasic olefin polymer containing a plurality of a polyolefin with different monomer units at different ratios from each other can be thereby obtained.

In this case, it is preferable that the olefin monomers in each step invariably contain propylene, so that particles of heterophasic propylene polymer, as a mixture of propylene (co-)polymers which invariably contain propylene as a monomer unit, with different monomers at different ratios from each other, can be obtained.

Examples of the heterophasic propylene polymer in the present embodiment include the following;

(i) a propylene polymer containing a propylene homopolymer component (I-1) and a propylene copolymer component (II);

(ii) a propylene polymer containing a propylene copolymer component (I-2) and a propylene copolymer component (II); and (iii) a propylene polymer containing a propylene homopolymer component (I-1), a propylene copolymer component (I-2) and a propylene copolymer component (II).

The propylene homopolymer component (I-1) is a homopolymer component of propylene that is only composed of monomer units derived from propylene. More specifically, the propylene copolymer component (I-2) and the propylene copolymer component (II) are as follows.

(Propylene Copolymer Component (I-2));

A copolymer component containing monomer units derived from propylene and monomer units derived from at least one olefin selected from the group consisting of ethylene and α-olefins having 4 or more and 12 or less of carbon atoms, with a content of the monomer units derived from at least one olefin selected from the group consisting of ethylene and α-olefins having 4 or more and 12 or less of carbon atoms of 0.01 wt % or more and less than 15 wt %, preferably 0.01 wt % or more and less than 12 wt %, more preferably 3 wt % or more and less than 10 wt %, based on a total weight of the propylene copolymer component (I-2) of 100 wt %. The content of the monomer units derived from propylene may be 85 wt % or more, or may be 90 wt % or more.

Propylene Copolymer Component (II):

A copolymer component containing monomer units derived from at least one olefin selected from the group consisting of ethylene and α-olefins having 4 or more and 12 or less of carbon atoms and monomer units derived from propylene, with a content of the monomer units derived from at least one olefin selected from the group consisting of ethylene and α-olefins having 4 or more and 12 or less of carbon atoms of 10 wt % or more and 80 wt % or less, preferably 20 wt % or more and 70 wt % or less, more preferably 25 wt % or more and 60 wt % or less, based on a total weight of the propylene polymer component (II) of 100 wt %. The content of the monomer units derived from propylene may be 20 wt % or more and 90 wt % or less.

Examples of the propylene copolymer component (I-2) include a propylene-ethylene copolymer component, a propylene-1-butene copolymer component, a propylene-1-hexene copolymer component, a propylene-1-octene copolymer component, a propylene-1-decene copolymer component, a propylene-ethylene-1-butene copolymer component, a propylene-ethylene-1-hexene copolymer component, a propylene-ethylene-1-octene copolymer component, and a propylene-ethylene-1-decene copolymer component, and preferably a propylene-ethylene copolymer component, a propylene-1-butene copolymer component, and a propylene-ethylene-1-butene copolymer component.

Examples of the propylene copolymer component (II) are the same as described above.

Examples of the heterophasic propylene polymer of the present embodiment include a (polypropylene)-(ethylene-propylene copolymer) heterophasic polymer, a (polypropylene-ethylene copolymer)-(ethylene-propylene copolymer) heterophasic polymer, and a (polypropylene)-(ethylene-propylene copolymer)-(ethylene-propylene-propylene copolymer) heterophasic polymer.

The content of the propylene copolymer component (II) in the heterophasic propylene polymer of the present embodiment is preferably 32 wt % or more, more preferably 35 wt % or more, furthermore preferably 40 wt % or more, based on a total weight of the heterophasic propylene polymer of 100 wt %.

In the present embodiment, examples of the α-olefin having 4 or more and 12 or less carbon atoms for use in the propylene copolymer component (I-2) or the propylene copolymer component (II) include 1-butene, 1-pentene, 1-hexene, 1-heptene, 1-octene, 1-nonene, 1-decene, 3-methyl-1-butene, 3-methyl-1-pentene, 4-methyl-1-pentene, 2-ethyl-1-hexene, and 2,2,4-trimethyl-1-pentene, preferably 1-butene, 1-hexene, and 1-octene, and more preferably 1-butene.

Second Embodiment

Figure 2:
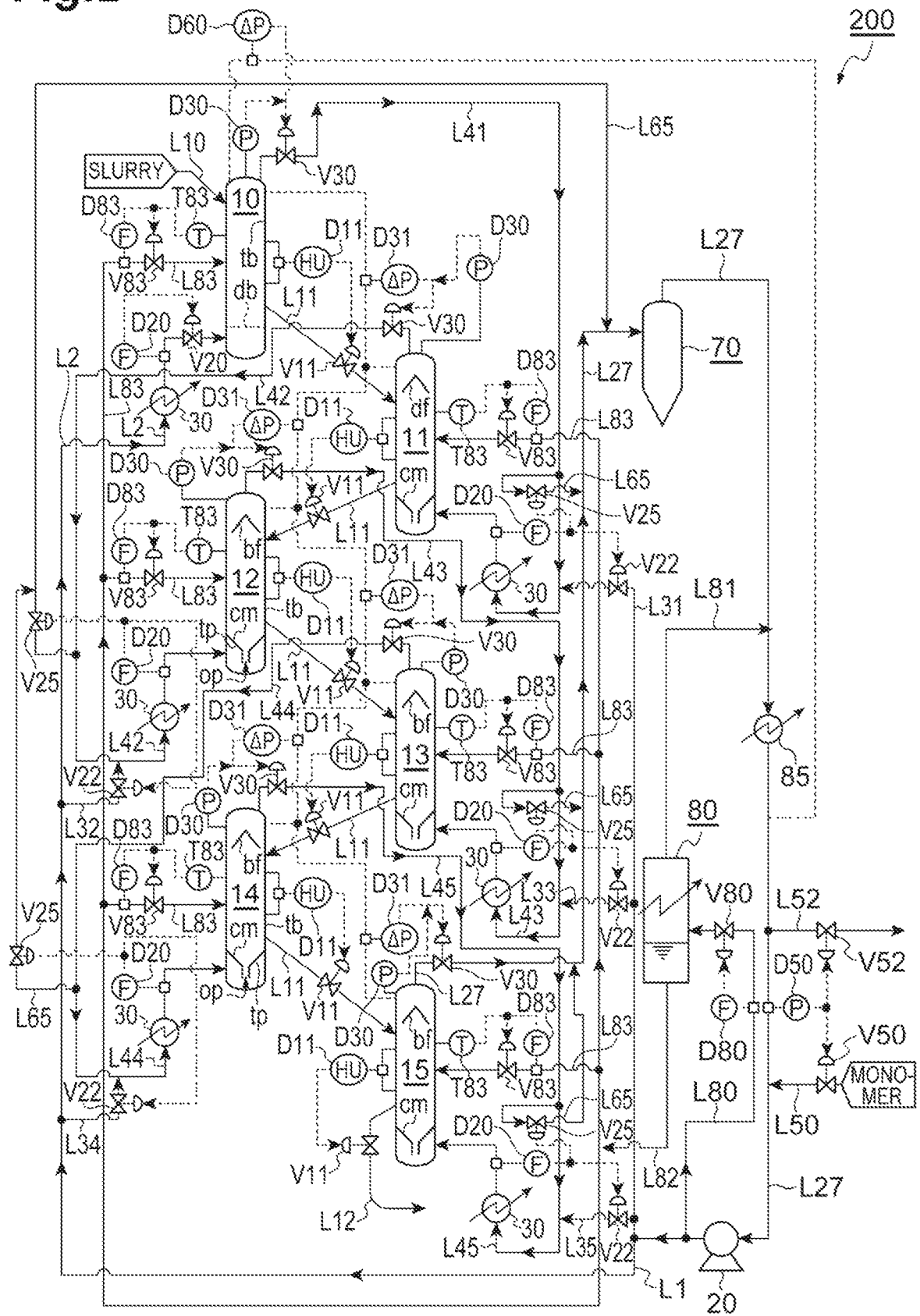
FIG. 2 is a flow chart illustrating a production system for use in the production method of a polyolefin in a second embodiment of the present invention.

Subsequently, with reference to FIG. 2, a method for producing polyolefin particles with use of polyolefin production system 200 in a second embodiment of the present invention is described.

In the present embodiment, a spouted bed of polyolefin particles is formed in the gas-phase polymerization tanks 11 to 15, differently from the first embodiment in which a fluidized bed of polyolefin particles is formed.

Specifically, the gas-phase polymerization tanks 11 to 15 are provided with a cone member cm having a tapered slope tp with inner diameter thereof becoming smaller downward and an opening op for gas introduction at the bottom end of the tapered slope tp, and a baffle bf installed above the opening op for gas introduction, instead of a distributor db.

The gas fed through the gas main feed line L2 or a combination of the gas transfer series lines L41 to L45 and the gas sub-feed lines L31 to L35 is fed under the cone member cm. Thereby, the gas blows out upward from the opening op for gas introduction, so that a spouted bed of polyolefin particles is formed on the cone member cm.

According to the present embodiment, the same effect can be achieved as in the first embodiment.

Third Embodiment

Figure 3:
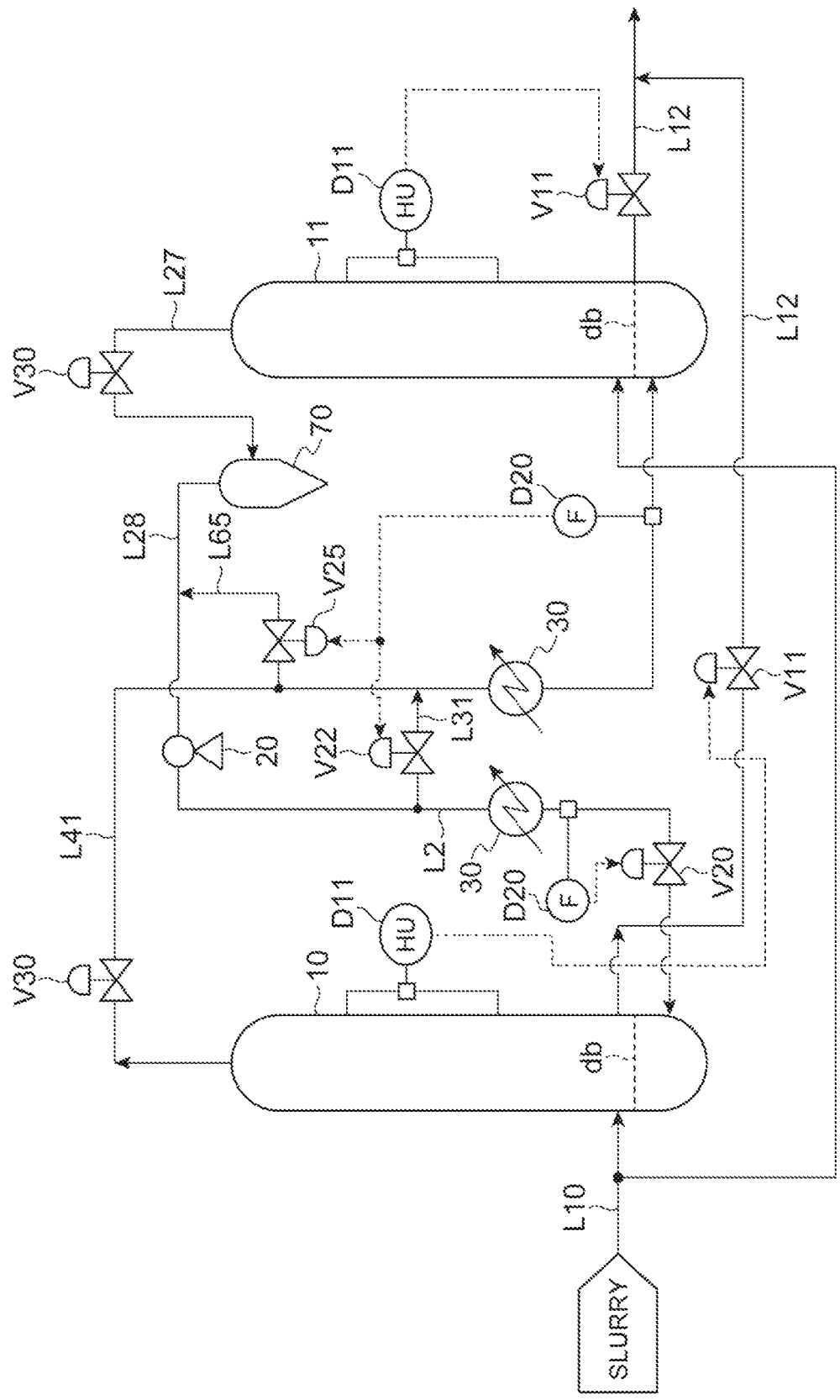
FIG. 3 is a flow chart illustrating a production system for use in the production method of a polyolefin in a third embodiment of the present invention.
Figure 4:
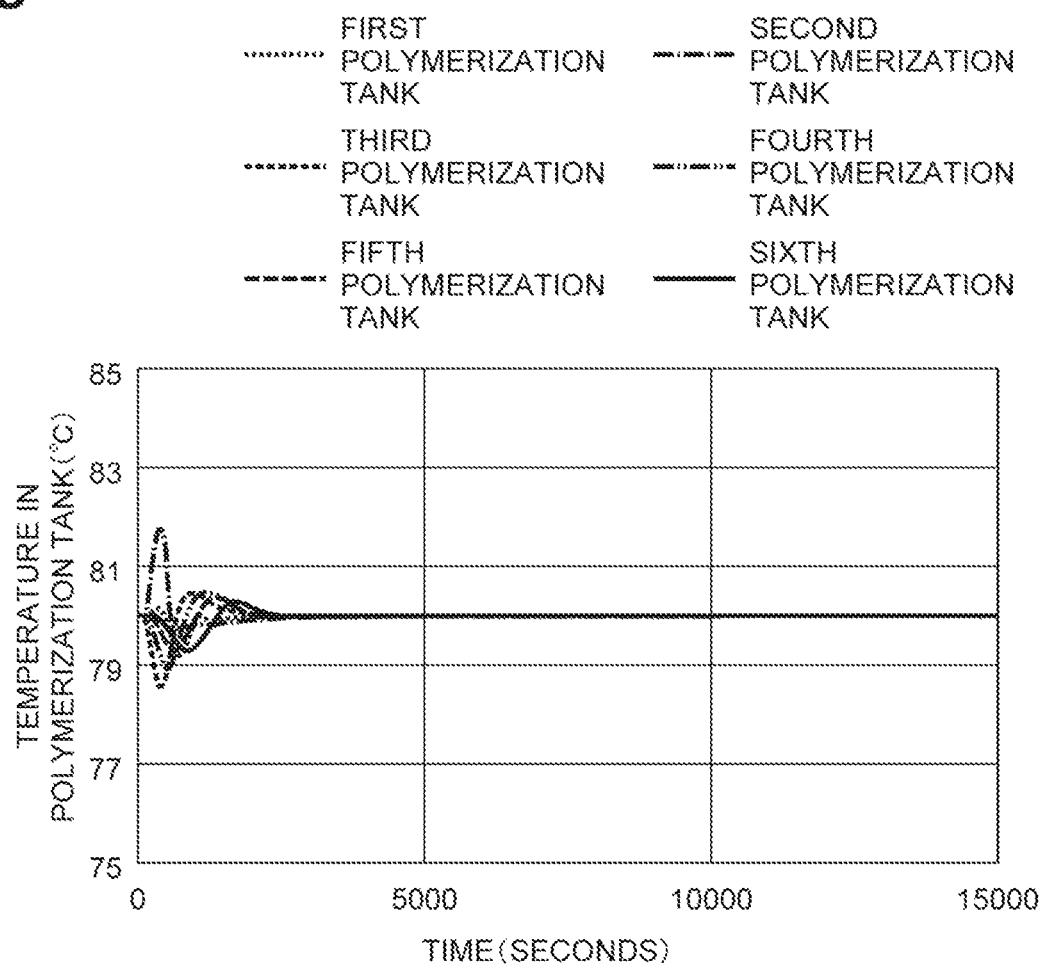
FIG. 4 is a graph illustrating a temporal change in temperature in each polymerization reaction tank when a disturbance 1 is added to the production method in a first embodiment.
Figure 5:
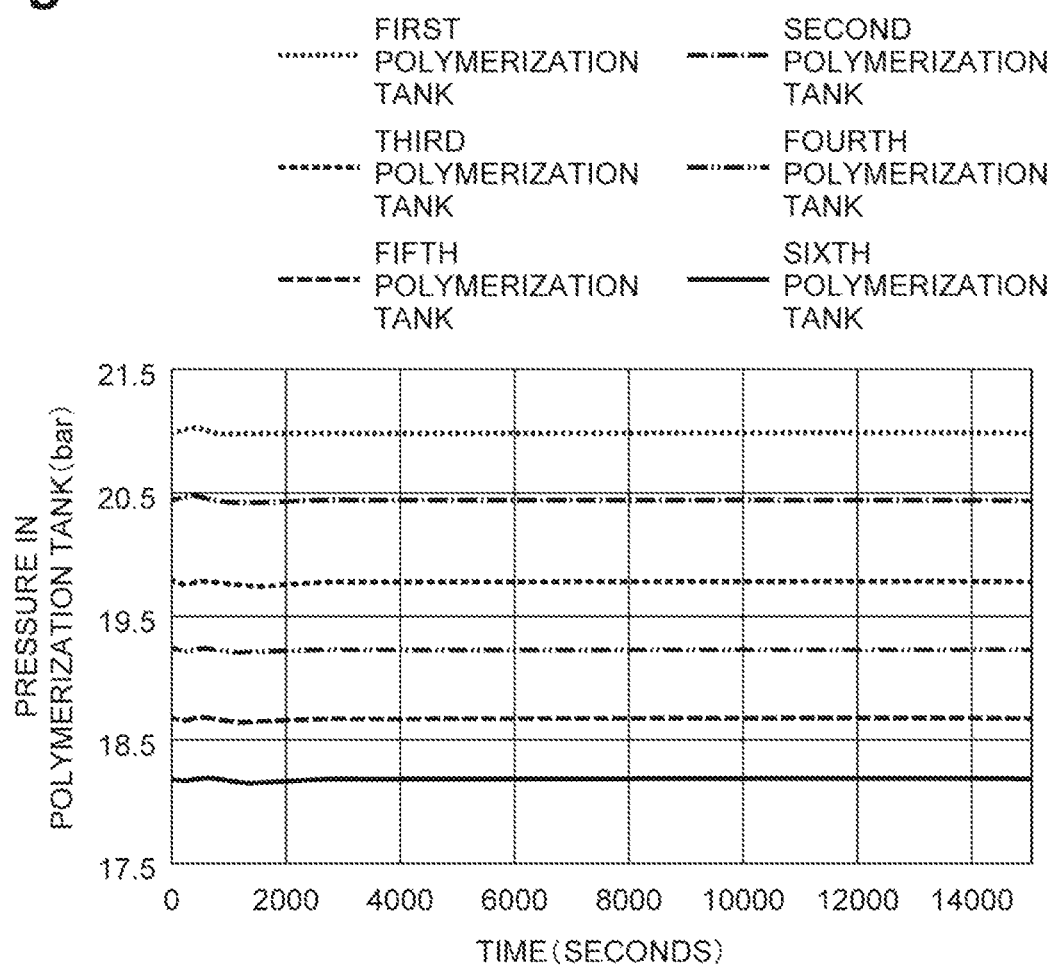
FIG. 5 is a graph illustrating a temporal change in pressure in each polymerization reaction tank when a disturbance 1 is added to the production method in a first embodiment.
Figure 6:
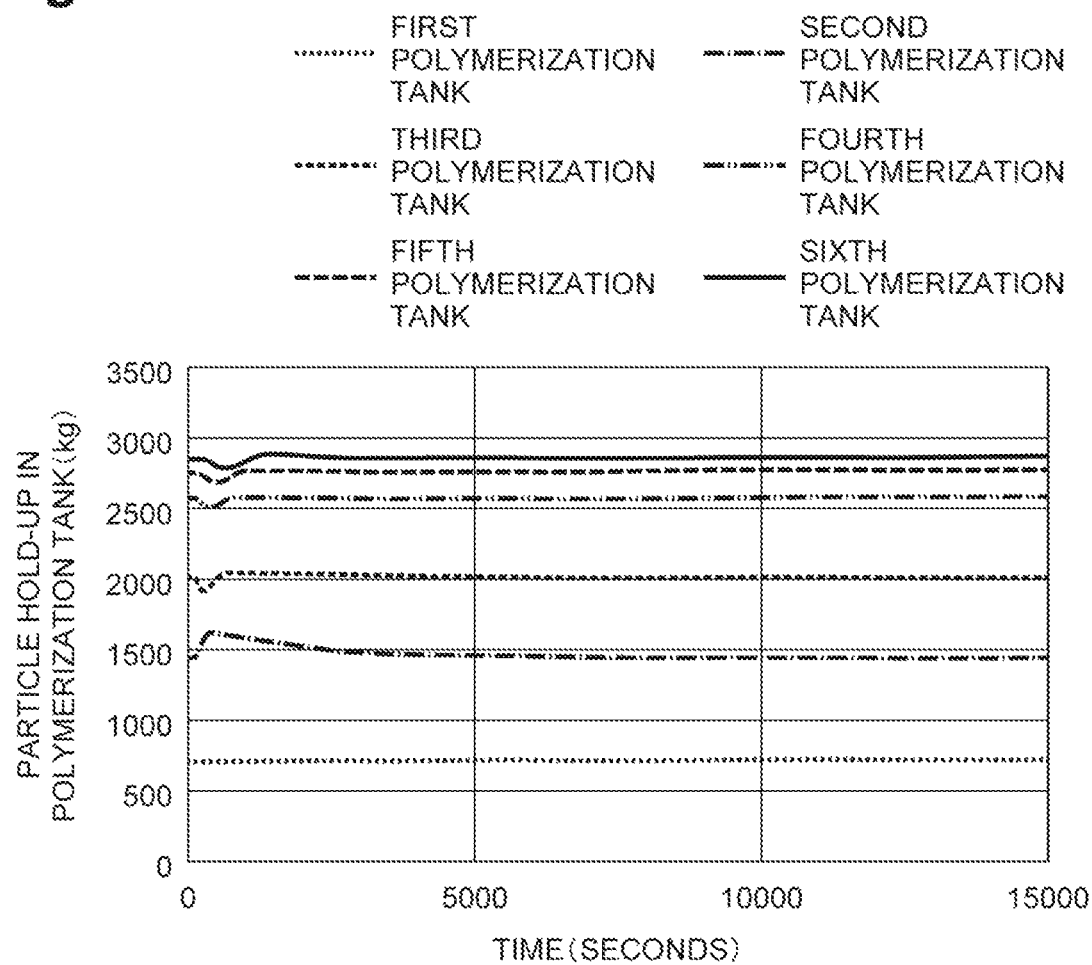
FIG. 6 is a graph illustrating a temporal change in particle hold-up in each polymerization reaction tank when a disturbance 1 is added to the production method in a first embodiment.
Figure 7:
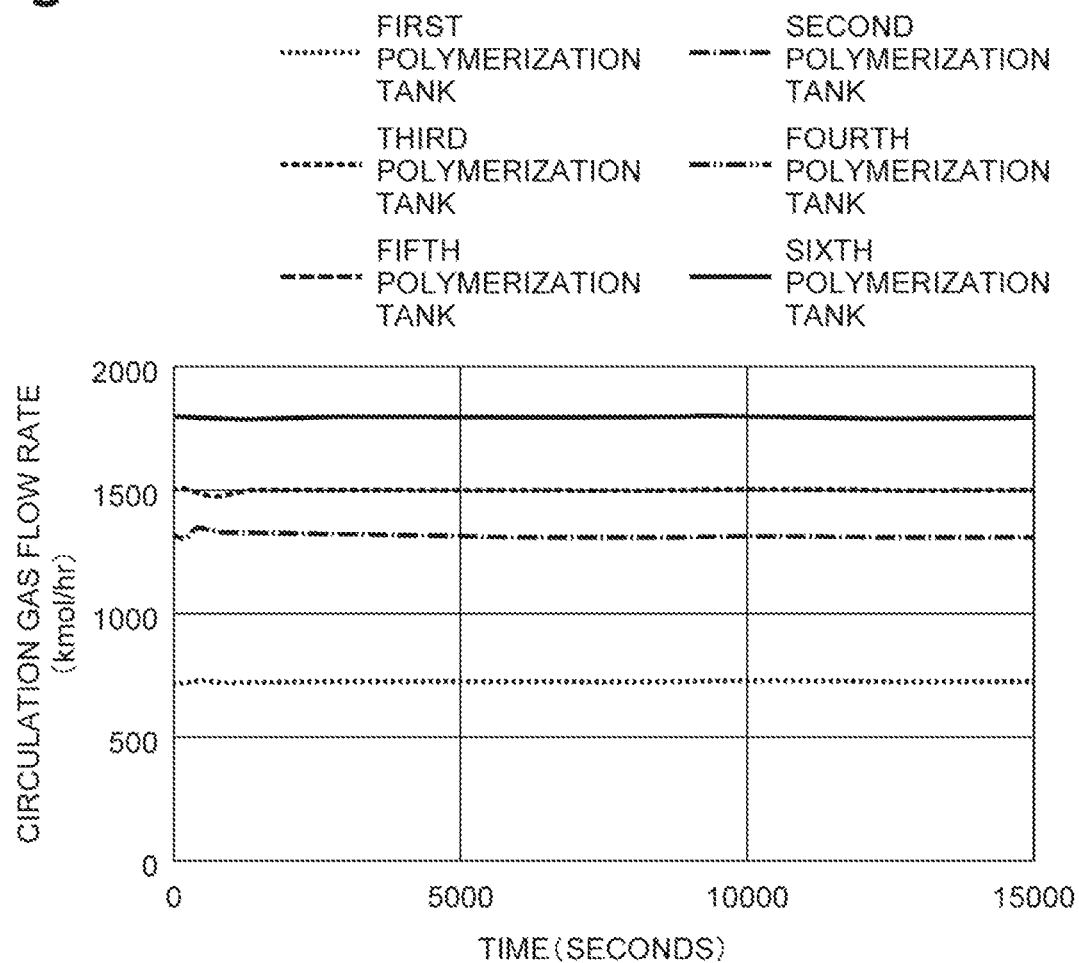
FIG. 7 is a graph illustrating a temporal change in feed rate of gas fed to each polymerization reaction tank when a disturbance 1 is added to the production method in a first embodiment.
Figure 8:
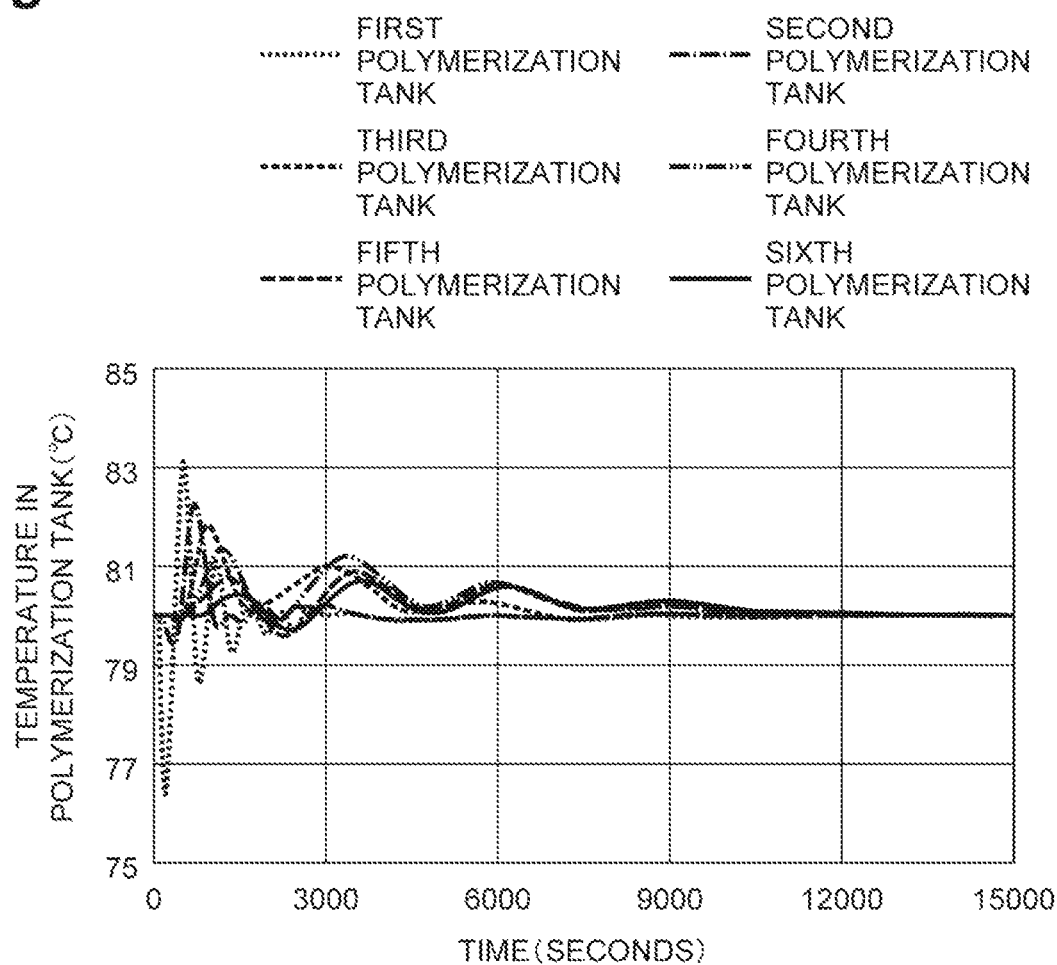
FIG. 8 is a graph illustrating a temporal change in temperature in each polymerization reaction tank when a disturbance 2 is added to the production method in a first embodiment.
Figure 9:
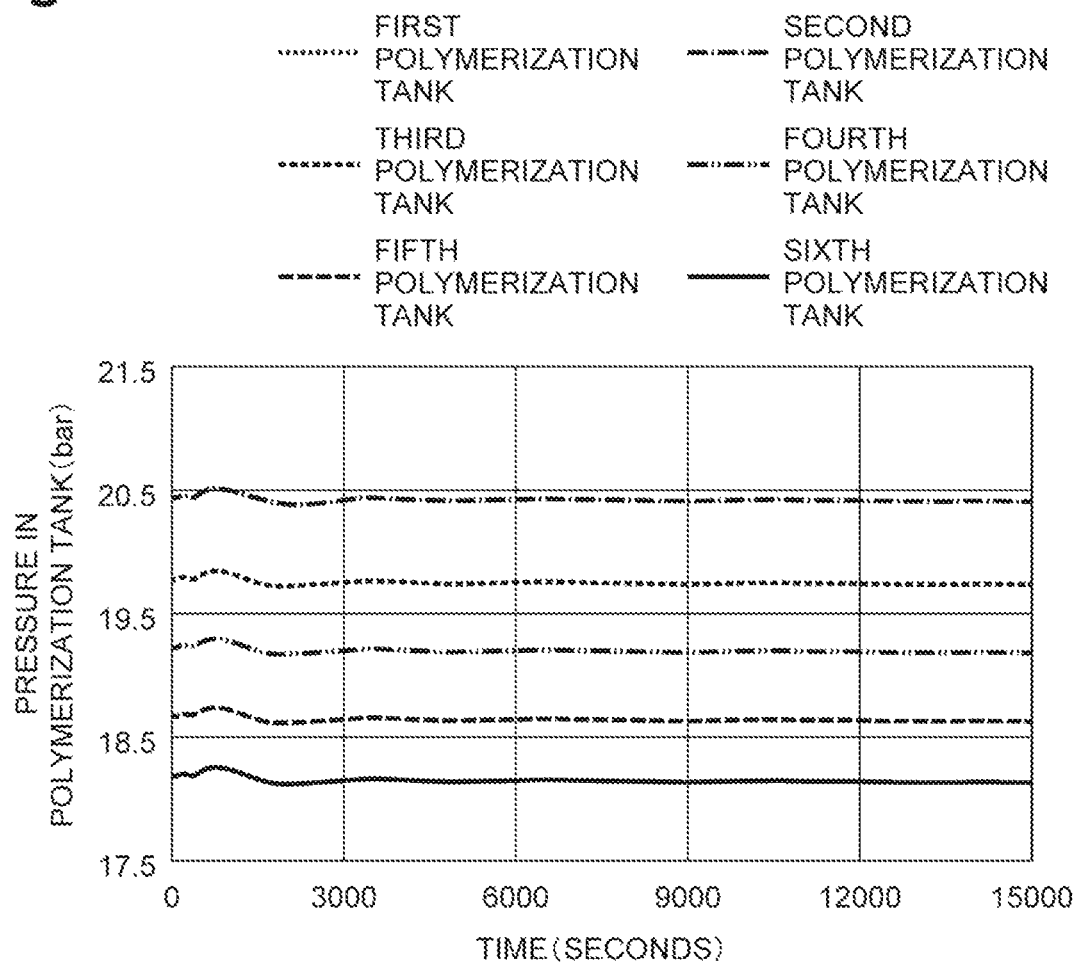
FIG. 9 is a graph illustrating a temporal change in pressure in each polymerization reaction tank when a disturbance 2 is added to the production method in a first embodiment.
Figure 10:
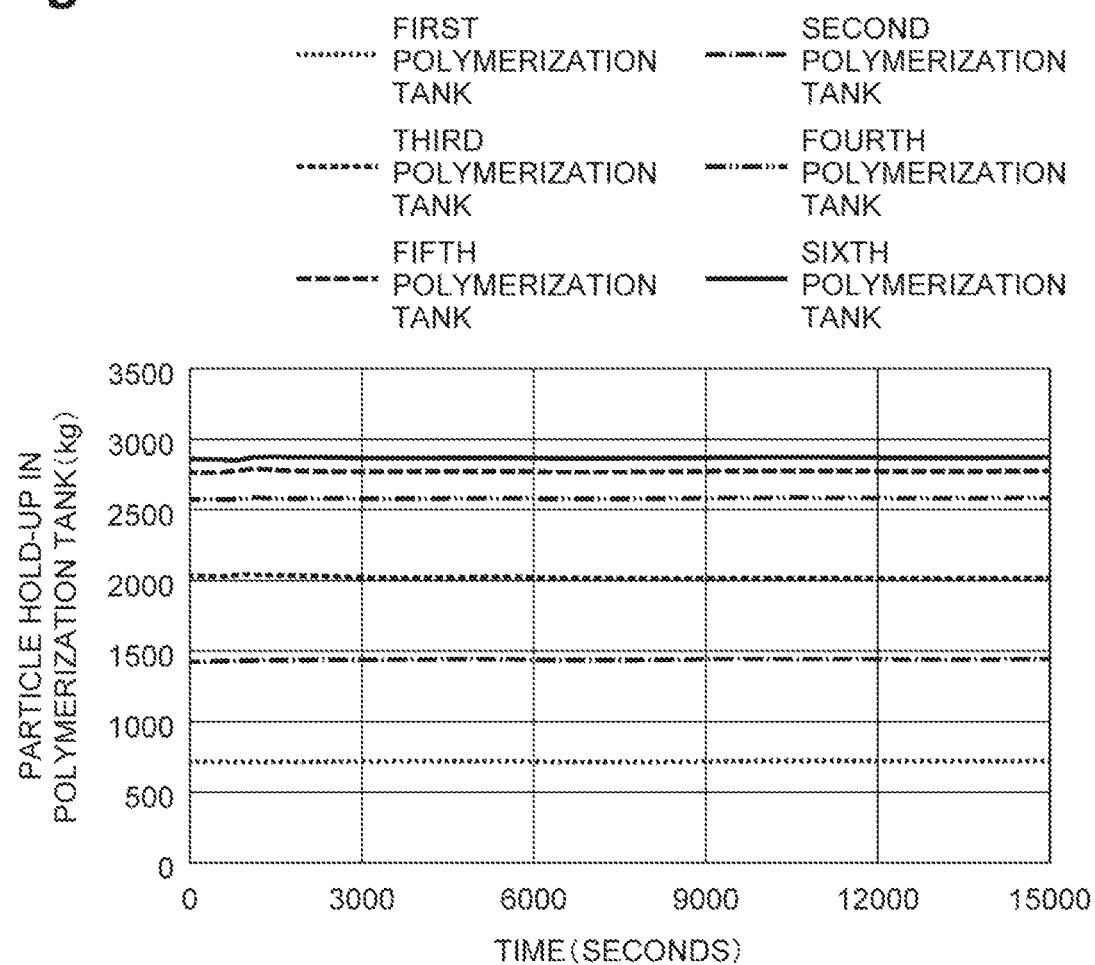
FIG. 10 is a graph illustrating a temporal change in particle hold-up in each polymerization reaction tank when a disturbance 2 is added to the production method in a first embodiment.
Figure 11:
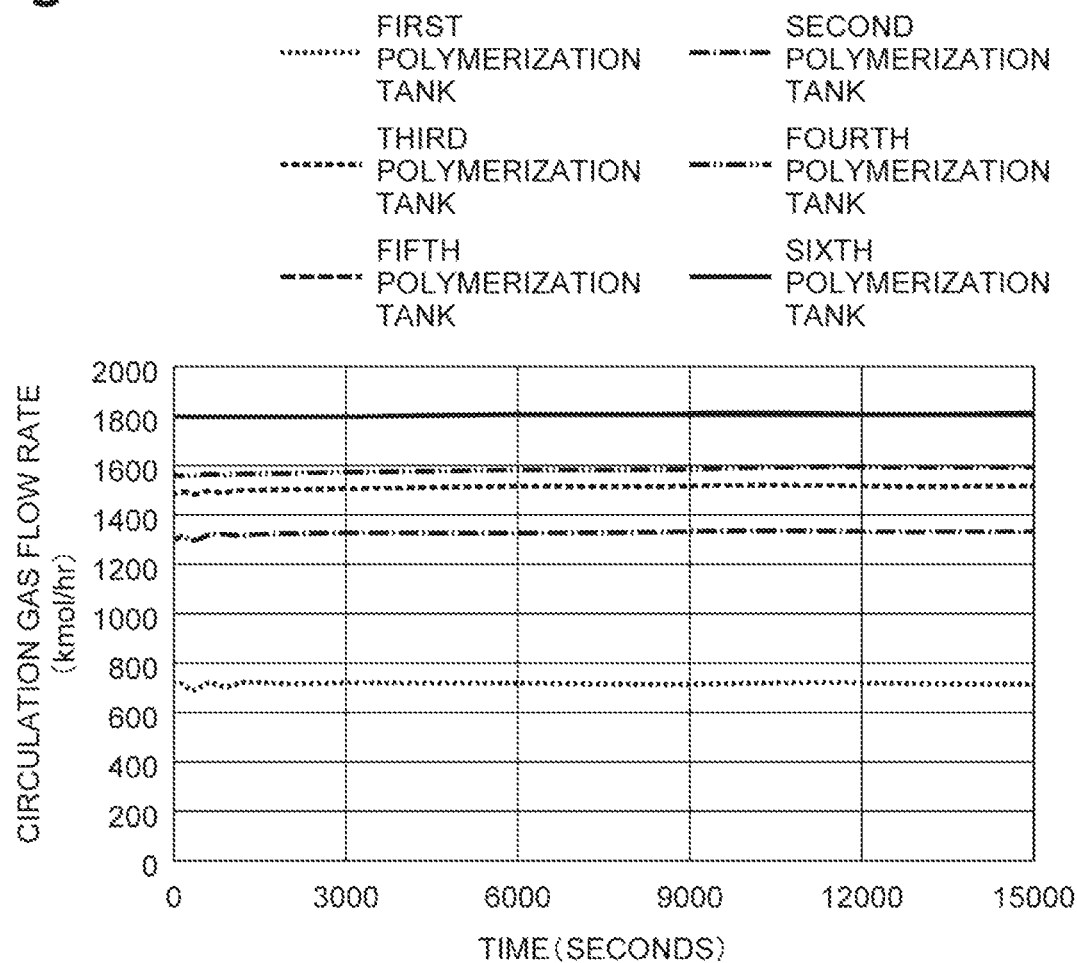
FIG. 11 is a graph illustrating a temporal change in feed rate of gas fed to each polymerization reaction tank when a disturbance 2 is added to the production method in a first embodiment.
Figure 12:
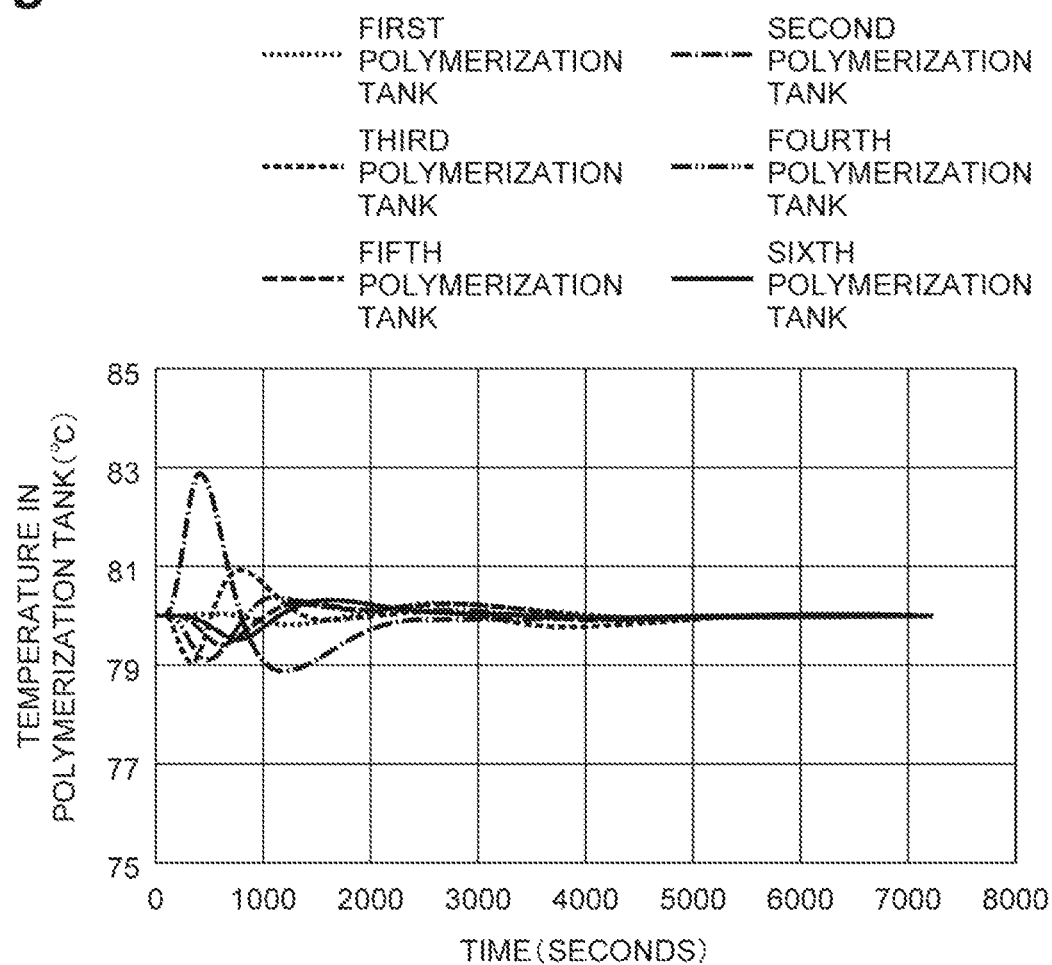
FIG. 12 is a graph illustrating a temporal change in temperature in each polymerization reaction tank when a disturbance 1 is added to the production method in a second embodiment.
Figure 13:
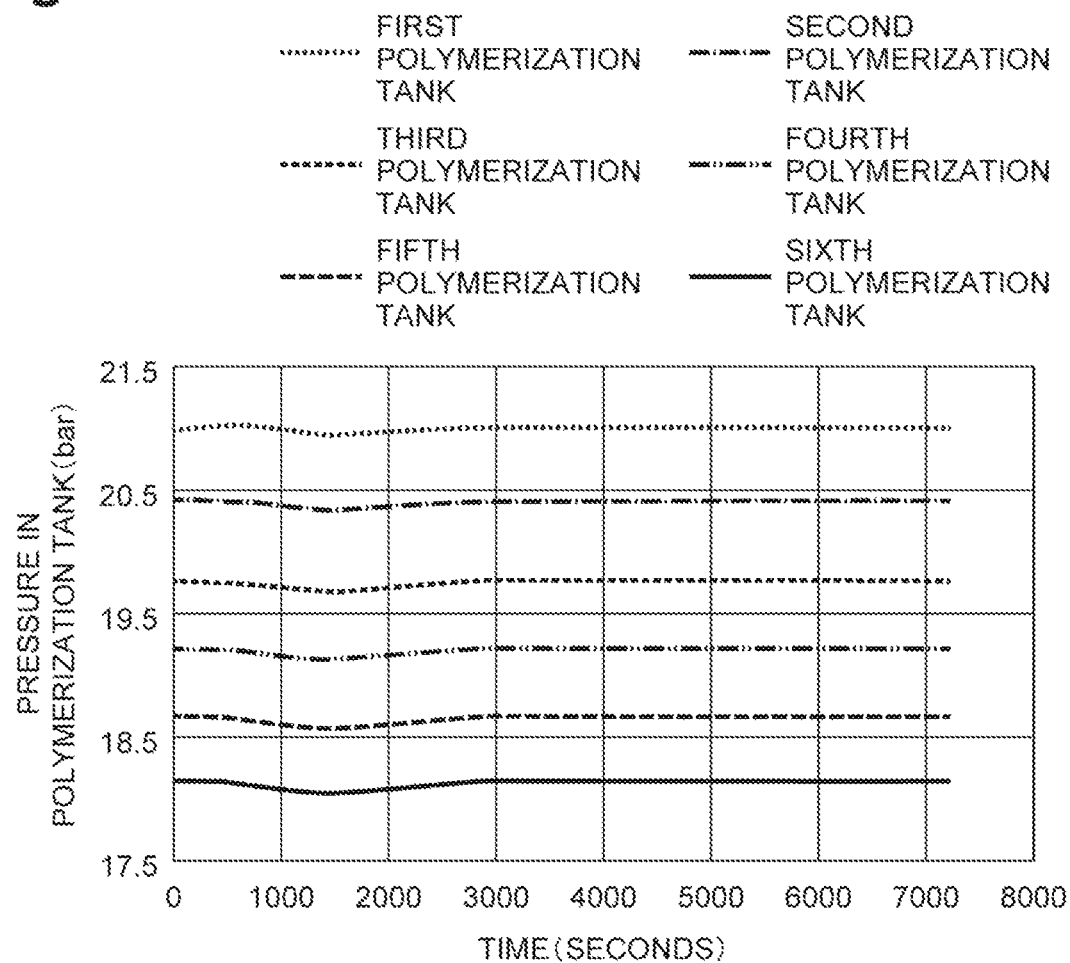
FIG. 13 is a graph illustrating a temporal change in pressure in each polymerization reaction tank when a disturbance 1 is added to the production method in a second embodiment.
Figure 14:
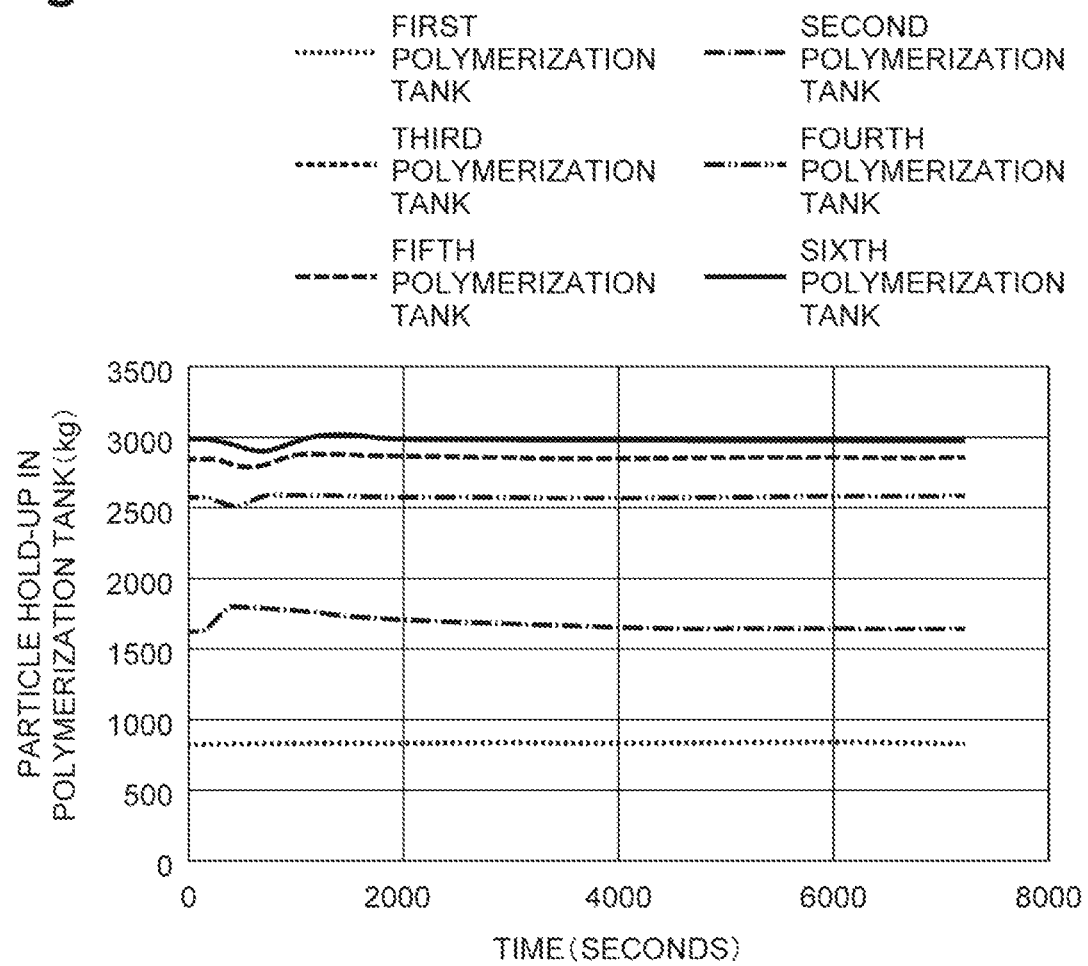
FIG. 14 is a graph illustrating a temporal change in particle hold-up in each polymerization reaction tank when a disturbance 1 is added to the production method in a second embodiment.
Figure 15:
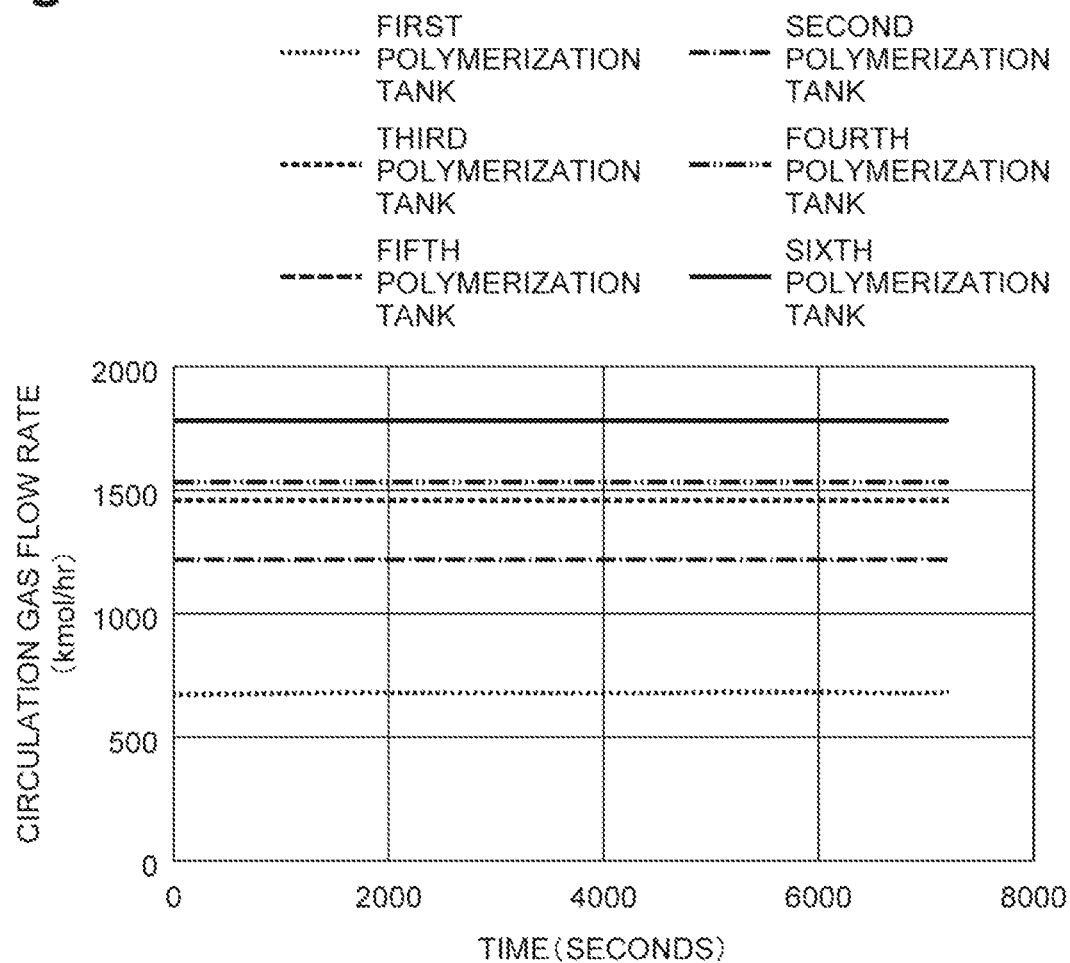
FIG. 15 is a graph illustrating a temporal change in feed rate of gas fed to each polymerization reaction tank when a disturbance 1 is added to the production method in a second embodiment.
Figure 16:
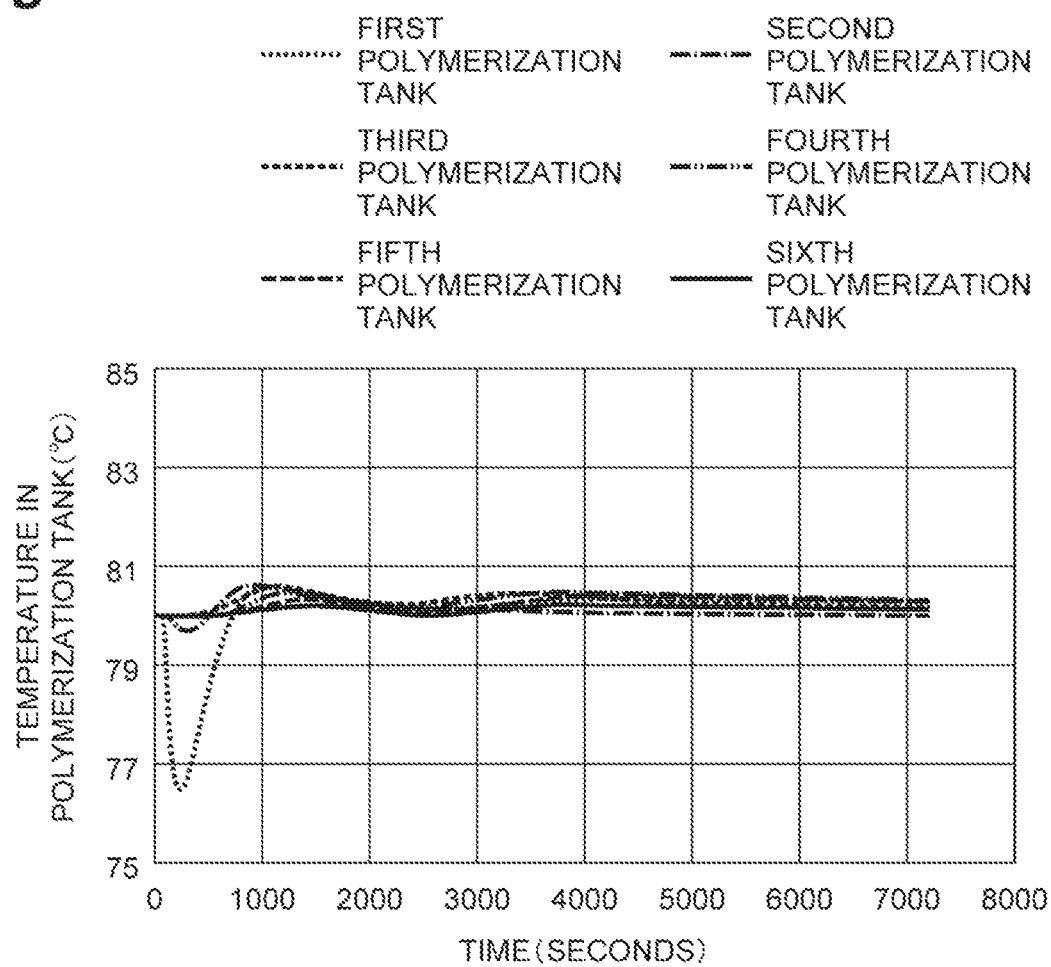
FIG. 16 is a graph illustrating a temporal change in temperature in each polymerization reaction tank when a disturbance 2 is added to the production method in a second embodiment.
Figure 17:
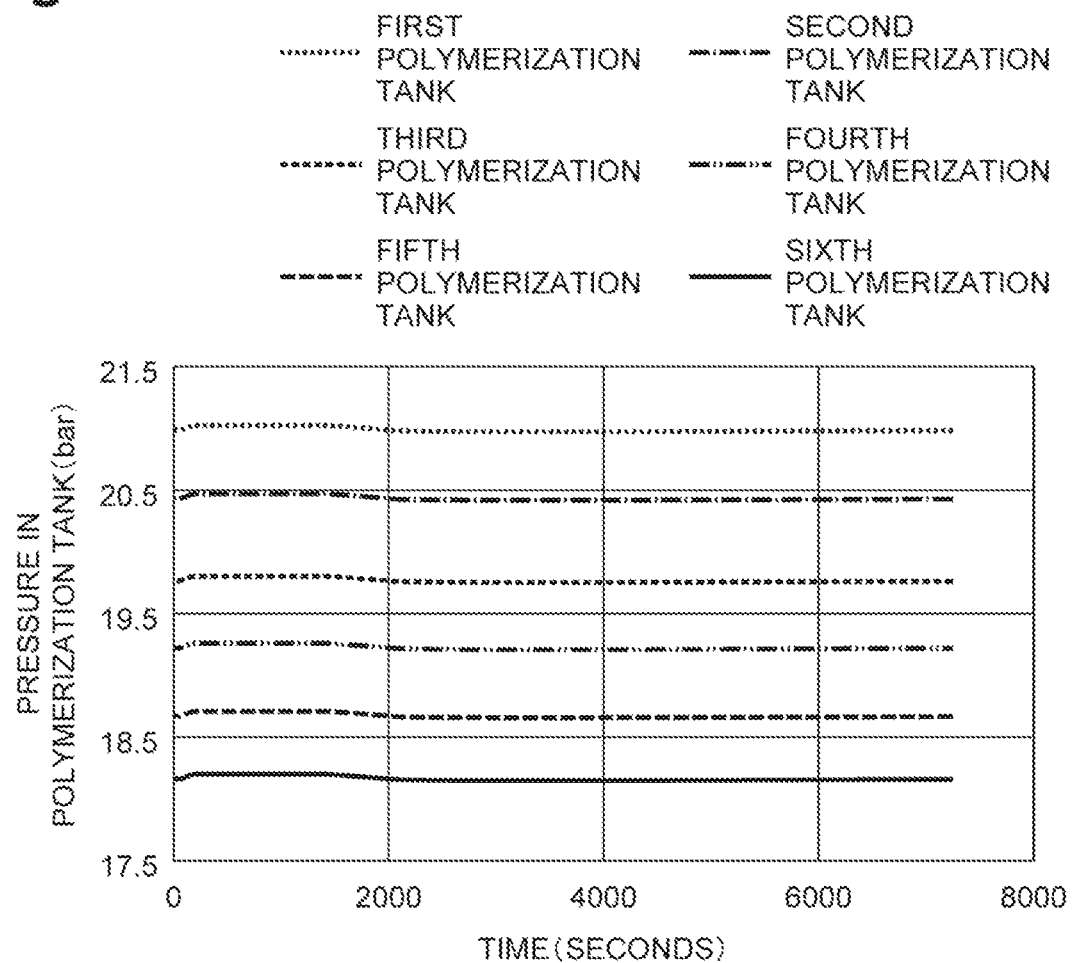
FIG. 17 is a graph illustrating a temporal change in pressure in each polymerization reaction tank when a disturbance 2 is added to the production method in a second embodiment.
Figure 18:
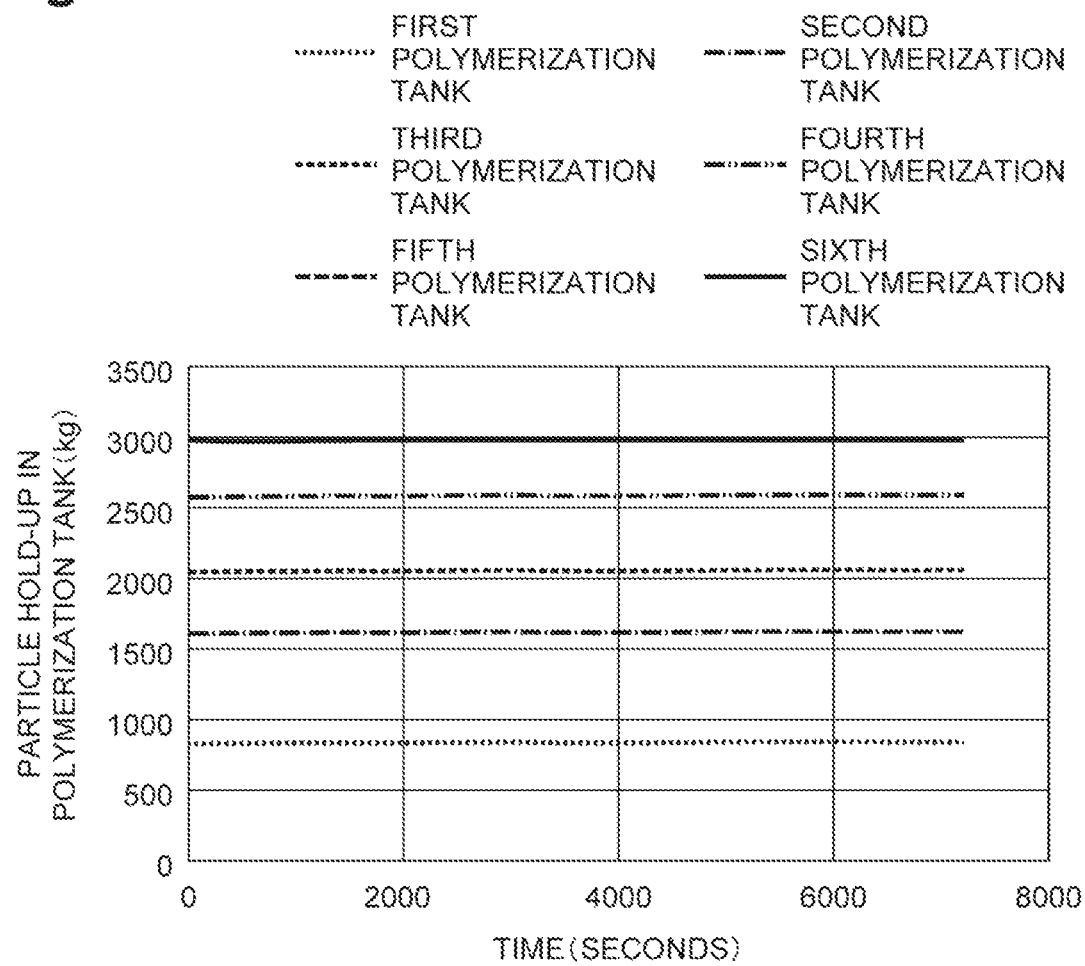
FIG. 18 is a graph illustrating a temporal change in particle hold-up in each polymerization reaction tank when a disturbance 2 is added to the production method in a second embodiment.
Figure 19:
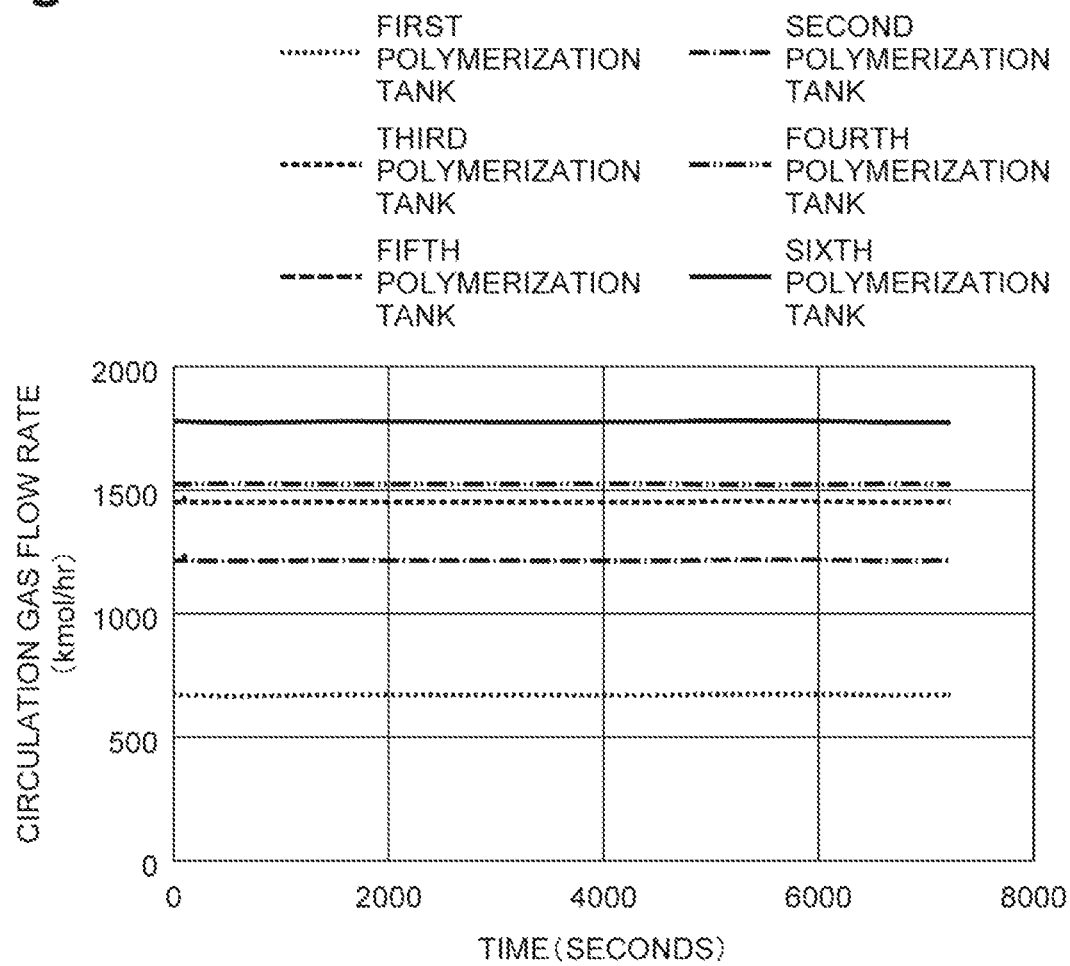
FIG. 19 is a graph illustrating a temporal change in feed rate of gas fed to each polymerization reaction tank when a disturbance 2 is added to the production method in a second embodiment.

Subsequently, with reference to FIG. 3, a method for producing polyolefin particles with use of a polyolefin production system 300 in a third embodiment of the present invention is described. Regarding the present embodiment, only the difference from the first embodiment is described. In FIG. 3, a line L50 for feeding monomers to a line L27, a line L52 for discharging the gas from the line L27, and the liquid monomer feed line having a condenser 80 and an individual liquefied olefin introduction line L83 are not shown in drawing.

The polyolefin production system 300 in the present embodiment has no particle transfer series line L11 and both of a catalyst component feed line L10 and a particle discharge line L12 are connected to each of gas-phase polymerization tanks 10 and 11, differently from the production system 100 in the first embodiment. In an example of the present embodiment, the system has two gas-phase polymerization tanks in total, and the gas discharge line L27 is connected to the gas-phase polymerization tank 11.

According to the method in the present embodiment, a catalyst component is fed to each of the gas-phase polymerization tanks 10 and 11 through the line L10, and the polyolefin particles obtained by polymerization are discharged from each of the polymerization tanks 10 and 11 through the line L12 so as to be fed to a rear step.

In the present embodiment also, the gas compressed by the compressor 20 is fed to the frontmost gas-phase polymerization tank 10 through the gas main feed line L2, and the gas discharged from the frontmost gas-phase polymerization tank 10 is transferred to the rearmost gas-phase polymerization tank 11 through the gas transfer series line L41, and further, the gas discharged from the rearmost gas-phase polymerization tank 11 is returned to the compressor 20 through the gas discharge line L27, so that the number of compressor 20 can be reduced. Also, an olefin-containing gas flows into the gas-phase polymerization tanks 10 and 11 in series, so that the flow rate of the gas in the gas-phase polymerization tanks can be easily maintained to be constant. Furthermore, since the flow rate of the olefin-containing gas fed to the gas-phase polymerization tank 10 is controlled by a valve (first valve) V20 installed in the gas main feed line L2, the flow rates of the gas fed to the gas-phase polymerization tank 10 and to the rear gas-phase polymerization tank 11 can be easily controlled.

Also, the effects of the compensation of monomers through the line L31 and the purge of monomers through the line L65 are the same as described above.

Since particles are not transferred between the gas-phase polymerization tanks 10 and 11 in the present embodiment, it is not necessary to provide a difference in pressure between the gas-phase polymerization tanks 10 and 11. Although the necessity of installing a valve V30 for controlling pressure in the lines L41 and L27 is therefore low, the pressure may be individually controlled by the installation.

(Modified Aspect)

The present invention is not limited to the embodiments described above, and various modified aspects can be employed.

For example, the number of the gas-phase polymerization tanks in each polyolefin production system is not limited as long as the system has at least two gas-phase polymerization tanks.

Also, among a plurality of the gas-phase polymerization tanks, a fluidized bed may be formed in any of the gas-phase polymerization tanks, and a spouted bed may be formed in any of the gas-phase polymerization tanks. For example, a spouted bed may be formed in all the gas-phase polymerization tanks.

In order to stably form the fluidized bed, feeding an amount of gas to achieve the minimum fluidization velocity Umf or more described in Japanese Unexamined Patent Publication No. 2009-161735 is preferred.

In order to stably form the spouted bed, feeding an amount of gas to achieve the minimum superficial gas velocity Ums or more described in Japanese Unexamined Patent Publication No. 2009-161735 is preferred. The spouted bed height in a spouted bed can be the maximum spouted bed height LsMAX or less described in Japanese Unexamined Patent Publication No. 2009-161735.

In the present embodiment, it is preferable that the amount of gas in the fluidized bed is less than a fast fluidizing velocity Utr.

Also, although in the control of pressure in the gas-phase polymerization tanks 11 to 15, the aperture of the valve V30 is controlled based on the differential pressure between each of the gas-phase polymerization tanks 11 to 15 and the gas-phase polymerization tank preceding the each of the gas-phase polymerization tanks, the aperture of the valve V30 may be controlled based on the pressure value in the gas-phase polymerization tank itself.

Although the gas sub-feed lines L31 to L35 and the gas purge lines L65 are connected to the gas transfer series lines L41 to L45 respectively in the embodiment described above, the gas sub-feed lines L31 to L35 and the gas purge lines L65 may be directly connected to the gas-phase polymerization tanks 11 to 15 respectively. In this instance, in the case where not only the gas transfer series lines L41 to L45, but also the gas sub-feed lines L31 to L35 and the gas purge lines L65 are each provided with a detector for detecting the flow rate, the amount of the gas fed to the respective gas-phase polymerization tanks and the amount of the gas discharged from the respective gas-phase polymerization tanks through the respective lines can be detected, so that the valve V20 in the gas sub-feed lines L31 to L35 can be controlled such that the total amount of the gas with regard to the respective gas-phase polymerization tanks is in a certain range.

Although gas sub-feed lines and gas purge lines are provided in the embodiment described above, rough adjustment of the flow rate can be performed by the valve V20 without the lines. The gas sub-feed line and the gas purge line may be provided in any of the gas transfer series lines, being not required to be provided in all of the lines.

Also, although a slight difference in pressure is provided between the gas-phase polymerization tanks by the valve V30 to suitably transfer particles through the particle transfer series line L11 in the first and second embodiments, the difference in pressure between the gas-phase polymerization tanks may not be provided by the valve V30 for the practice. For example, a mechanical method such as use of a screw feeder allows particles to be transferred without difference in pressure. In that case, it is not necessary to provide a valve V30 for pressure control in the lines L20 to L25. Alternatively, the valve V30 may be installed in any one of the gas transfer series lines L41 to L45 and the gas discharge line L27.

In the embodiment described above, the inner diameters of the gas transfer series lines L41 to L45 are smaller than the inner diameters of the gas-phase polymerization tanks 10 to 15 respectively. The inner diameter of a line corresponds to an equivalent circle diameter of a space on the cross section vertical to the axial direction of the line, and the inner diameter of a gas-phase polymerization tank corresponds to an equivalent circle diameter in a space on the horizontal cross section of the cylindrical container. For example, in the case where the inner diameter is different among the gas-phase polymerization tanks from each other, the inner diameter of the gas transfer series line is smaller than the inner diameter of the gas-phase polymerization tank having a minimum inner diameter. Use of such a gas transfer series line allows flexibility of the disposition of each of the gas-phase polymerization tanks to increase. For example, a pair of gas-phase polymerization tanks connected in series may be disposed at a distance in the vertical direction, the horizontal direction, or the orthogonal direction. However, in an aspect other than the above, for example, in the case where the inner diameters of the gas-phase polymerization tanks are the same from each other, the inner diameters of the gas transfer series lines L41 to L45 may be the same as the inner diameters of the gas-phase polymerization tanks respectively. In the case where the inner diameters of the gas-phase polymerization tanks are different from each other, the present invention can be carried out even with the inner diameters of the gas transfer series lines being the same as the larger one of the inner diameters of the gas-phase polymerization tanks at both ends of the respective lines.

Also, the shape of the distributor db for use in forming a fluidized bed in the gas-phase polymerization tanks 10 to 15 is not particularly limited, and various types of gas distributors including a porous plate, a mesh plate, and a porous plate with a cap can be used. Also, the shape of the cone member cm for use in forming a spouted bed in the gas-phase polymerization tanks 10 to 15 is not particularly limited as long as the cone member cm has a tapered slope tp with inner diameter thereof becoming smaller downward and an opening op for gas introduction at the bottom end of the tapered slope tp, and the spouted bed can be formed without installation of a baffle bf. It is preferable that the angle made between the tapered slope tp of the cone member cm and a horizontal plane is 20 to 80°. Although the cone member cm is present independently from the bottom member to constitute a cylindrical container tb in the embodiment described above, the cone member cm may, of course, constitute the bottom of the cylindrical container tb, allowing the gas to be fed directly into the tank through the opening op.

(Simulation Example)

The stability of the method for producing a polyolefin in the first embodiment and the second embodiment was evaluated by a dynamic simulation. As a process simulator, Aspen Custom Modeler (available from AspenTech Japan Co., Ltd.) was used.

Under the following conditions, the production method in the first embodiment and the second embodiment was simulated.

A slurry of catalyst-containing polypropylene particles was continuously fed to a first gas-phase polymerization tank, and the particles in each of gas-phase polymerization tanks 10 to 15 were transferred to the rear gas-phase polymerization tank through a particle transfer series line L11. The pressure in the front gas-phase polymerization tank was maintained higher than the pressure in the rear gas-phase polymerization tank, and the particle transfer series line L11 was inclined at an inclination angle θ of 60° as shown in FIG. 1. The amount of particles transferred was adjusted through the aperture of a valve V11 in the particle transfer series line L11, such that each particle hold-up of the fluidized bed in the gas-phase polymerization tank on the front stage was made constant.

The flow rate of the gas fed to the gas-phase polymerization tanks 10 to 15 was adjusted by the valve V20 in the gas main feed line L2 and the valve V20 in the gas sub-feed lines L31 to L35 respectively so as to be constant, and the pressure of the gas-phase polymerization tanks was adjusted by the valve V30 in the gas transfer series lines L41 to L45 and the gas discharge line L27 respectively so as to be constant.

Removing of the polymerization heat in a fluidized bed in the gas-phase polymerization tanks 10 to 15 is performed by cooling the gas with a heat exchanger 30 installed in the gas main feed line L2 and the gas transfer series lines L41 to L45 respectively. Also, a part of the gas discharged from a compressor was liquefied with a condenser 80, and the condensed liquid was individually fed to each of the gas-phase polymerization tanks 10 to 15 so as to remove the polymerization heat through the latent heat of the condensed liquid.

To a steady operation state constructed under the polymerization conditions shown in Table 1 (corresponding to the first embodiment) or Table 2 (corresponding to the second embodiment), the following disturbance 1 or 2 was added to confirm the temporal changes in the temperature, the pressure, the circulation gas flow rate, and the particle hold-up in each of the gas-phase polymerization tanks.

Disturbance 1: The transfer of propylene particles from the second gas-phase polymerization tank 11 to the third gas-phase polymerization tank 12 was suspended for 60 seconds.

Disturbance 2: The amount of slurry fed to the first gas-phase polymerization tank 10 was increased 1.2 times.

[Method for Evaluating Results of Simulation]

The case where the fluctuations of the temperature, pressure, circulation gas flow rate, and particle hold-up in each of the gas-phase polymerization tanks caused by a disturbance were in proportions of up to less than 10% relative to values in a steady state, and the fluctuations converged with time, with the operation state in a steady state recovered, was evaluated as having resistance to disturbance.

[Simulation results on addition of disturbance 1 (temporal suspension of polypropylene particle transport between tanks) in the first embodiment (6-stage fluidized bed)]

As shown in FIGS. 4 to 7, although each of the values fluctuated temporally in each of the gas-phase polymerization reaction tanks, the fluctuations were in proportions of up to less than 10% relative to values in a steady state, and the fluctuations converged with time, with the operation state in a steady state recovered, so that the polymerization process was confirmed to have resistance to disturbance.

[Simulation results on application of disturbance 2 (1.2 times increase in shiny feed rate to first gas-phase polymerization tank) in the first embodiment (6-stage fluidized bed)]

As shown in FIGS. 8 to 11, although each of the values fluctuated temporally in each of the gas-phase polymerization tanks, the fluctuations were in proportions of up to less than 10% relative to values in a steady state, and the fluctuations converged with time, with the operation state in a steady state recovered, so that the polymerization process was confirmed to have resistance to disturbance.

[Simulation results on application of disturbance 1 (temporal suspension of polypropylene particle transport between tanks) in second embodiment (1-stage fluidized bed and 5-stage spouted bed)]

As shown in FIGS. 12 to 15, although each of the values fluctuated temporally in each of the reaction tanks, the fluctuations were in proportions of up to less than 10% relative to values in a steady state, and the fluctuations converged with time, with the operation state in a steady state recovered, so that the polymerization process was confirmed to have resistance to disturbance.

[Simulation results on application of disturbance 2 (1.2 times increase in slurry feed rate to first gas-phase polymerization tank) in the second embodiment (1-stage fluidized bed and 5-stage spouted bed)]

As shown in FIGS. 16 to 19, although each of the values fluctuated temporally in each of the reaction tanks, the fluctuations were in proportions of up to less than 10% relative to values in a steady state, and the fluctuations converged with time, with the operation state in a steady state recovered, so that the polymerization process was confirmed to have resistance to disturbance.

TABLE 1

| | | First gas-phase polymerization tank | Second gas-phase polymerization tank | Third gas-phase polymerization tank | Fourth gas-phase polymerization tank | Fifth gas-phase polymerization tank | Sixth gas-phase polymerization tank |
|---|---|---|---|---|---|---|---|
| Temperature | ° C. | 80 | 80 | 80 | 80 | 80 | 80 |
| Pressure | bar | 21.0 | 20.5 | 19.8 | 19.2 | 18.7 | 18.2 |
| Feed rate of gas | kmol/hr | 770 | 1249 | 1422 | 1487 | 1712 | 1732 |
| Type of gas | — | Propylene | Propylene | Propylene | Propylene | Propylene | Propylene |
| Particle hold-up | kg | 710 | 1434 | 2025 | 2572 | 2763 | 2852 |
| Amount polymerized | kg/h | 1468 | 1450 | 1259 | 1092 | 864 | 693 |

TABLE 2

|  |  | First gas-phase polymerization tank | Second gas-phase polymerization tank | Third gas-phase polymerization tank | Fourth gas-phase polymerization tank | Fifth gas-phase polymerization tank | Sixth gas-phase polymerization tank |
| --- | --- | --- | --- | --- | --- | --- | --- |
| Temperature | °C. | 80 | 80 | 80 | 80 | 80 | 80 |
| Pressure | bar | 21.0 | 20.4 | 19.8 | 19.2 | 18.7 | 18.2 |
| Feed rate of gas | kmol/hr | 677 | 1215 | 1460 | 1530 | 1780 | 1780 |
| Type of gas | — | Propylene | Propylene | Propylene | Propylene | Propylene | Propylene |
| Particle hold-up | kg | 831 | 1621 | 2070 | 2587 | 2851 | 2968 |
| Amount polymerized | kg/h | 1304 | 1313 | 1103 | 993 | 842 | 706 |

What is claimed is:

1. A polyolefin production system comprising:
a plurality of gas-phase polymerization tanks configured to polymerize an olefin gas to form a polyolefin;
a gas transfer series line connecting the plurality of the gas-phase polymerization tanks to each other in series;
a compressor comprising an inlet and an outlet and being configured to compress an olefin-containing gas;
a gas main feed line disposed at the frontmost gas-phase polymerization tank, configured to guide the gas fed from the outlet of the compressor to the frontmost gas-phase polymerization tank;
a gas discharge line disposed at the rearmost gas-phase polymerization tank; and
a first valve installed in the gas main feed line.

2. The polyolefin production system according to claim 1, wherein the first valve is a butterfly valve or an eccentric rotary plug valve.

3. The polyolefin production system according to claim 1, further comprising a second valve installed in the gas transfer series line connecting at least one pair of the gas-phase polymerization tanks to each other.

4. The polyolefin production system according to claim 1, further comprising a second valve installed in the gas discharge line.

5. The polyolefin production system according to claim 3, wherein the second valve is a butterfly valve or an eccentric rotary plug valve.

6. The polyolefin production system according to claim 1, further comprising a gas sub-feed line connecting at least one of the gas-phase polymerization tanks other than the frontmost gas-phase polymerization tank to the outlet of the compressor without going through each of other gas-phase polymerization tanks.

7. The polyolefin production system according to claim 6, further comprising a third valve installed in the gas sub-feed line.

8. The polyolefin production system according to claim 1, further comprising a gas purge line connecting the gas transfer series line to the inlet of the compressor without going through each of other gas-phase polymerization tanks.

9. The polyolefin production system according to claim 8, further comprising a fourth valve installed in the gas purge line.

10. The polyolefin production system according to claim 1, further comprising a particle transfer series line connecting the plurality of the gas-phase polymerization tanks to each other in series.

11. The polyolefin production system according to claim 1, comprising in each of the gas-phase polymerization tanks a cone member having a tapered slope with inner diameter thereof becoming smaller downward and an opening at the bottom end of the tapered slope, or a distributor.

12. The polyolefin production system according to claim 1, wherein the inner diameter of the gas transfer series line is smaller than the inner diameter of each of the gas-phase polymerization tanks.

13. A method for producing a polyolefin with use of the polyolefin production system according to claim 1, comprising:
a step of feeding an olefin-containing gas compressed by the compressor to the frontmost gas-phase polymerization tank through the gas main feed line;
a step of transferring the gas discharged from the frontmost gas-phase polymerization tank to the rearmost gas-phase polymerization tank through the gas transfer series line, sequentially;
a step of returning the gas discharged from the rearmost gas-phase polymerization tank to the compressor through the gas discharge line; and
a step of controlling the flow rate of the gas to be fed to the frontmost gas-phase polymerization tank through the gas main feed line by the first valve installed in the gas main feed line.

14. A method for producing a polyolefin with use of the polyolefin production system according to claim 3, comprising:
a step of feeding an olefin-containing gas compressed by the compressor to the frontmost gas-phase polymerization tank through the gas main feed line;
a step of transferring the gas discharged from the frontmost gas-phase polymerization tank to the rearmost gas-phase polymerization tank through the gas transfer series line, sequentially;
a step of returning the gas discharged from the rearmost gas-phase polymerization tank to the compressor through the gas discharge line;
a step of controlling the flow rate of the gas to be fed to the frontmost gas-phase polymerization tank through the gas main feed line by the first valve installed in the gas main feed line; and
a step of controlling the aperture of the second valve in such a manner that the pressure in the upstream gas-phase polymerization tank than the second valve, the difference between the pressure in the upstream gas-phase polymerization tank than the second valve and the pressure in the further upstream gas-phase polymerization tank than the upstream gas-phase polymerization tank, or the difference between the pressure in the upstream gas-phase polymerization tank than the second valve and the pressure in the downstream gas-phase polymerization tank than the second valve is in a predetermined range.

15. A method for producing a polyolefin with use of the polyolefin production system according to claim 4, comprising:
- a step of feeding an olefin-containing gas compressed by the compressor to the frontmost gas-phase polymerization tank through the gas main feed line;
- a step of transferring the gas discharged from the frontmost gas-phase polymerization tank to the rearmost gas-phase polymerization tank through the gas transfer series line, sequentially;
- a step of returning the gas discharged from the rearmost gas-phase polymerization tank to the compressor through the gas discharge line;
- a step of controlling the flow rate of the gas to be fed to the frontmost gas-phase polymerization tank through the gas main feed line by the first valve installed in the gas main feed line; and
- a step of controlling the aperture of the second valve in such a manner that the difference between the pressure in one of the gas-phase polymerization tanks and the pressure in the downstream part than the second valve in the gas discharge line is in a predetermined range.

16. A method for producing a polyolefin with use of the polyolefin production system according to claim 6, comprising:
- a step of feeding an olefin-containing gas compressed by the compressor to the frontmost gas-phase polymerization tank through the gas main feed line;
- a step of transferring the gas discharged from the frontmost gas-phase polymerization tank to the rearmost gas-phase polymerization tank through the gas transfer series line, sequentially;
- a step of returning the gas discharged from the rearmost gas-phase polymerization tank to the compressor through the gas discharge line;
- a step of controlling the flow rate of the gas to be fed to the frontmost gas-phase polymerization tank through the gas main feed line by the first valve installed in the gas main feed line; and
- a step of feeding the olefin-containing gas compressed by the compressor to at least one of the gas-phase polymerization tanks other than the frontmost gas-phase polymerization tank through the gas sub-feed line.

17. A method for producing a polyolefin with use of the polyolefin production system according to claim 7, comprising:
- a step of feeding an olefin-containing gas compressed by the compressor to the frontmost gas-phase polymerization tank through the gas main feed line;
- a step of transferring the gas discharged from the frontmost gas-phase polymerization tank to the rearmost gas-phase polymerization tank through the gas transfer series line, sequentially;
- a step of returning the gas discharged from the rearmost gas-phase polymerization tank to the compressor through the gas discharge line;
- a step of controlling the flow rate of the gas to be fed to the frontmost gas-phase polymerization tank through the gas main feed line by the first valve installed in the gas main feed line;
- a step of feeding the olefin-containing gas compressed by the compressor to at least one of the gas-phase polymerization tanks other than the frontmost gas-phase polymerization tank through the gas sub-feed line; and
- a step of controlling the flow rate of the gas to be fed through the gas sub-feed line by the third valve.

18. A method for producing a polyolefin with use of the polyolefin production system according to claim 8, comprising:
- a step of feeding an olefin-containing gas compressed by the compressor to the frontmost gas-phase polymerization tank through the gas main feed line;
- a step of transferring the gas discharged from the frontmost gas-phase polymerization tank to the rearmost gas-phase polymerization tank through the gas transfer series line, sequentially;
- a step of returning the gas discharged from the rearmost gas-phase polymerization tank to the compressor through the gas discharge line;
- a step of controlling the flow rate of the gas to be fed to the frontmost gas-phase polymerization tank through the gas main feed line by the first valve installed in the gas main feed line; and
- a step of returning a part of the gas flowing in the gas transfer series line to the compressor through the gas purge line.

19. A method for producing a polyolefin with use of the polyolefin production system according to claim 9, comprising:
- a step of feeding an olefin-containing gas compressed by the compressor to the frontmost gas-phase polymerization tank through the gas main feed line;
- a step of transferring the gas discharged from the front most gas-phase polymerization tank to the rearmost gas-phase polymerization tank through the gas transfer series line, sequentially;
- a step of returning the gas discharged from the rearmost gas-phase polymerization tank to the compressor through the gas discharge line;
- a step of controlling the flow rate of the gas to be fed to the frontmost gas-phase polymerization tank through the gas main feed line by the first valve installed in the gas main feed line;
- a step of returning a part of the gas flowing in the gas transfer series line to the compressor through the gas purge line; and
- a step of controlling the flow rate of the gas to be returned to the compressor through the gas purge line by the fourth valve.

20. A method for producing a polyolefin with use of the polyolefin production system according to claim 10, comprising:
- a step of feeding an olefin-containing gas compressed by the compressor to the frontmost gas-phase polymerization tank through the gas main feed line;
- a step of transferring the gas discharged from the frontmost gas-phase polymerization tank to the rearmost gas-phase polymerization tank through the gas transfer series line, sequentially;
- a step of returning the gas discharged from the rearmost gas-phase polymerization tank to the compressor through the gas discharge line;
- a step of controlling the flow rate of the gas to be fed to the frontmost gas-phase polymerization tank through the gas main feed line by the first valve installed in the gas main feed line; and
- a step of transferring polyolefin particles sequentially from the frontmost gas-phase polymerization tank to the rearmost gas-phase polymerization tank through the particle transfer series line.

21. The method according to claim 13, further comprising a step of forming in each of the gas-phase polymerization tanks a fluidized bed of polyolefin particles or a spouted bed of polyolefin particles.

\* \* \* \* \*